(12) United States Patent
Stanich et al.

(10) Patent No.: US 11,973,919 B2
(45) Date of Patent: *Apr. 30, 2024

(54) COLOR SPACE INK MODEL GENERATION MECHANISM

(71) Applicant: Ricoh Company, Ltd., Tokyo (JP)

(72) Inventors: Mikel Stanich, Boulder, CO (US); Pallavi Premkumar, Boulder, CO (US); James Chauvin, Boulder, CO (US); Nikita Gurudath, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 192 days.

This patent is subject to a terminal disclaimer.

(21) Appl. No.: 17/686,522

(22) Filed: Mar. 4, 2022

(65) Prior Publication Data

US 2023/0283739 A1 Sep. 7, 2023

(51) Int. Cl.
*G06K 15/02* (2006.01)
*B41J 29/393* (2006.01)
(Continued)

(52) U.S. Cl.
CPC .......... *H04N 1/6058* (2013.01); *B41J 29/393* (2013.01); *B41J 2/04536* (2013.01)

(58) Field of Classification Search
CPC .... H04N 1/6058; B41J 29/393; B41J 2/04536
See application file for complete search history.

(56) References Cited

U.S. PATENT DOCUMENTS 6,484,631 B2 11/2002 Degani et al.
7,423,778 B2 9/2008 Hersch et al.
(Continued)

FOREIGN PATENT DOCUMENTS

CN 107945097 4/2018
DE 102013113281 7/2014
(Continued)

OTHER PUBLICATIONS

Rius, M., Casaldàliga, M., Vargas, X. F., Quintero, X., Segura, R., & del Vallès, S. C. (Jan. 2015). Printer Calibrations for HP Large Format Page Wide Technology. In NIP & Digital Fabrication Conference (vol. 2015, No. 1, pp. 326-331). Society for Imaging Science and Technology.

(Continued)

*Primary Examiner* — Quang N Vo
(74) *Attorney, Agent, or Firm* — Jaffery Watson Mendonsa & Hamilton LLP

(57) ABSTRACT

A printing system is disclosed. The printing system includes at least one physical memory device to store ink model estimation logic and one or more processors coupled with the at least one physical memory device to execute the ink model estimation logic to receive a first plurality of ink deposition curves each associated with one of a plurality of primary color inks of a print system, wherein the associated primary color inks in combination represent a first secondary color, receive a color space mapping profile for the print system, wherein the color space mapping profile characterizes a relationship between a first color space and a printer color space of the print system and generate a color space ink model for the first secondary color based on the first plurality of ink deposition curves and the color space mapping profile, wherein the color space ink model represents a relationship between each of a plurality of parameters of the first color space and ink deposition.

20 Claims, 17 Drawing Sheets

(51) Int. Cl.
   *G06K 15/10*   (2006.01)
   *H04N 1/60*    (2006.01)
   *B41J 2/045*   (2006.01)

(56) References Cited

U.S. PATENT DOCUMENTS

| | | |
|---|---|---|
| 7,773,256 B2 | 8/2010 | Edge |
| 8,100,057 B2 | 1/2012 | Hartmann et al. |
| 8,322,811 B2 | 12/2012 | Chandu et al. |
| 8,576,450 B2 | 11/2013 | Shepherd et al. |
| 8,705,121 B2 | 4/2014 | Hattenberger |
| 8,734,034 B2 | 5/2014 | Morovic et al. |
| 8,923,713 B2 | 12/2014 | Terao et al. |
| 9,019,561 B1 | 4/2015 | Sanchez et al. |
| 9,056,485 B2 | 6/2015 | Szafraniec |
| 9,096,056 B2 | 8/2015 | Zhou et al. |
| 9,102,157 B2 | 8/2015 | Prothon et al. |
| 9,132,629 B2 | 9/2015 | Ward et al. |
| 9,347,874 B2 | 5/2016 | Keydar et al. |
| 9,427,963 B2 | 8/2016 | Clippingdale et al. |
| 9,565,339 B2 | 2/2017 | Noffke et al. |
| 9,621,762 B2 | 4/2017 | Chandu et al. |
| 9,643,408 B1 | 5/2017 | Schweid |
| 9,656,463 B1 | 5/2017 | Ernst et al. |
| 9,661,154 B1 | 5/2017 | Stanich |
| 9,785,873 B2 | 10/2017 | Stanich et al. |
| 10,129,436 B2 | 11/2018 | Kimura |
| 10,214,038 B2 | 2/2019 | Klinger et al. |
| 10,237,452 B2 | 3/2019 | Rius Rossell et al. |
| 10,338,496 B2 | 7/2019 | Able et al. |
| 10,549,523 B2 | 2/2020 | Stanich et al. |
| 11,182,113 B2 | 11/2021 | Stanich et al. |
| 2003/0179410 A1 | 9/2003 | Velde |
| 2010/0067936 A1 | 3/2010 | Kitajima et al. |
| 2013/0101328 A1 | 4/2013 | Morovic et al. |
| 2013/0176600 A1 | 7/2013 | Chandu et al. |
| 2013/0222461 A1 | 8/2013 | Kaszynski |
| 2017/0080732 A1 | 3/2017 | Kasahara |
| 2017/0118360 A1 | 4/2017 | Amer |
| 2017/0201654 A1 | 7/2017 | Rossell |
| 2017/0259560 A1 | 9/2017 | Sreenivasan et al. |
| 2018/0234582 A1 | 8/2018 | Stanich et al. |
| 2019/0238723 A1 | 8/2019 | Morovic |
| 2019/0268482 A1 | 8/2019 | Stanich et al. |
| 2019/0270304 A1 | 9/2019 | Stanich |
| 2019/0351674 A1 | 11/2019 | Stritzel |
| 2020/0108621 A1 | 4/2020 | Ferreri |
| 2021/0271943 A1 | 9/2021 | Stanich et al. |

FOREIGN PATENT DOCUMENTS

| | | |
|---|---|---|
| EP | 0454448 | 10/1991 |
| EP | 2313272 B1 | 2/2010 |
| JP | 2015054934 | 3/2015 |
| JP | 2018-1751 | 1/2018 |
| JP | 2018174143 | 11/2018 |
| JP | 2020-37238 | 3/2020 |
| WO | 2018022077 A1 | 2/2018 |

OTHER PUBLICATIONS

Milder, O. B., Tarasov, D. A., & Titova, M. Y. (2017, March). Inkjet printers linearization using 3D gradation curves. In CEUR Workshop Proceedings. Proceedings of the 1st International Workshop on Radio Electronics & Information Technologies (REIT 2017), Yekaterinburg, Russia (vol. 1814, pp. 74-83).

Jangra, A., Verma, S. & Boora, S. (2017). Identifying the Relationship Between Solid Ink Density and Dot Gain in Digital Printing. International Research Journal of Management Science & Technology, 8(3), 15-20. doi:10.32804/IRJMST. See highlighted and underlined sections.

Alamán, J. et al. (Nov. 2016). Inkjet Printing of Functional Materials for Optical and Photonic Applications. Materials 2016, 9(910). doi: 10.3390/ma9110910. See highlighted and underlined sections.

Office Action for U.S. Appl. No. 17/686,534, 14 pages, dated Dec. 22, 2022.

Office Action for U.S. Appl. No. 17/165,291, 10 pages, dated Aug. 16, 2022.

Office Action for U.S. Appl. No. 17/184,821, dated Jun. 20, 2022, 21 pages.

European Search Report for EP22150361.8, dated Jul. 8, 2022, 11 pages.

Notice of Allowance for U.S. Appl. No. 17/165,238, 10 pages, dated Jun. 7, 2022.

U.S. Appl. No. 17/184,821 entitled. "Color Space Ink Model Generation Mechanism", filed Feb. 25, 2021, 45 pages.

U.S. Appl. No. 17/165,291 entitled. "Ink Model Generation Mechanism", filed Feb. 2, 2021, 46 pages.

Bugnon et al., "Calibrating Ink Spreading Curves by Optimal Selection of Tiles from Printed Color Images", vol. 21, Issue 1, paper 013024 (2012), pp. 1-14.

Park, J., Kim, B., Kim, S. Y., & Hwang, J. (2014). Prediction of drop-on-demand (DOD) pattern size in pulse voltage-applied electrohydrodynamic (EHD) jet printing of Ag colloid ink. Applied Physics A, 117(4), 2225-2234.

U.S. Appl. No. 17/165,238 entitled, "Ink Model Generation Mechanism", filed Feb. 2, 2021, 47 pages.

COLOR SPACE INK MODEL GENERATION MECHANISM

FIELD OF THE INVENTION

The invention relates to the field of image reproduction.

BACKGROUND

Determining ink model parameter estimates typically involves applying an ink model to generate the parameter estimates based on OD vs ink deposition parameters. However, the application of conventional ink models to generate the parameters has limitations.

Accordingly, a mechanism to generate color space ink model parameter data estimates is desired.

SUMMARY

In one embodiment, a printing system is disclosed. The printing system includes at least one physical memory device to store ink model logic and one or more processors coupled with at least one physical memory device to execute the ink model logic to receive a first plurality of ink deposition curves each associated with one of a plurality of primary color inks of a print system, wherein the associated primary color inks in combination represent a first secondary color, receive a color space mapping profile for the print system, wherein the color space mapping profile characterizes a relationship between a first color space and a printer color space of the print system and generate a color space ink model for the first secondary color based on the first plurality of ink deposition curves and the color space mapping profile, wherein the color space ink model represents a relationship between each of a plurality of parameters of the first color space and ink deposition.

BRIEF DESCRIPTION OF THE DRAWINGS

A better understanding of the present invention can be obtained from the following detailed description in conjunction with the following drawings, in which.

DETAILED DESCRIPTION

A mechanism for generating color space ink model parameter data estimates is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
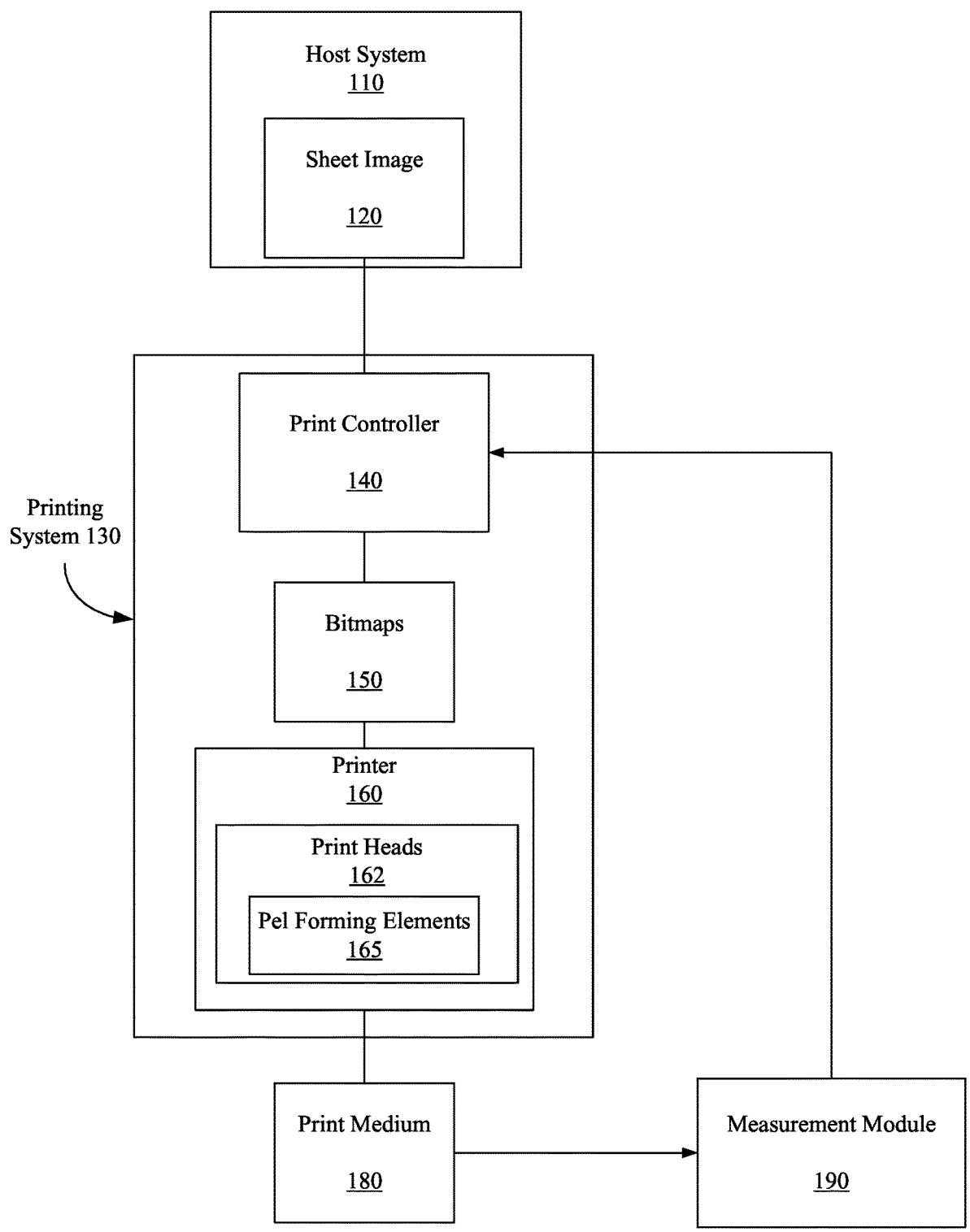
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser).

The pel forming elements may be grouped onto one or more printheads (e.g., one or more printhead arrays). The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)). These types of marking materials are known as primary colors.

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of several gray shades, including black and white (e.g., Cyan, Magenta, Yellow, and blacK, (CMYK) and secondary colors (e.g., hues of Red, Green and Blue) that are obtained using a combination of primary colors). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 contains the instructions (e.g., instructed ink drop size and/or location) for the one or more printheads 162 and/or pel forming elements 165. Bitmap 150 may be a halftoned bitmap (e.g., a calibrated halftone bit map generated from calibrated halftones, or uncalibrated halftone bit map generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of ink model and drop size system to obtain measurements of the printed medium 180. The measured results are communicated to print controller 140 to be used to generate ink model parameter data, as well as generate drop size data. The measurement system may be a stand-alone process or be integrated into the printing system 130.

According to one embodiment, measurement module 190 may be a sensor to take measurements of printed images on print medium 180. Measurement module 190 may generate and transmit print image measurement data. Print image measurement data (e.g., color space measurement data) may be color response data for the parameters (e.g., coordinates) of a specific color space (e.g., CIELAB, CIEXYZ, a first color space, etc.) corresponding to a printed image that is either raw or processed. In one embodiment, measurement module 190 may comprise one or more sensors that each or in total take measurements for printed markings produced for some or all pel forming elements 165.

In another embodiment, measurement module 190 may be a camera system, in-line scanner, or spectrophotometer, where the preferred embodiment is a spectrophotometer. In a further embodiment, print image measurement data may include a map information to correlate portions (e.g., a pel or plurality of pels) of the print image data to the corresponding pel forming elements 165 that produced the portions of the printed images. In a further embodiment, measurement module 190 includes capability to measure ink volumes processed during printing, generate ink volume data, and transmit ink volume data to allow one to determine the drop sizes ejected by the pel forming elements 165.

Figure 2A:
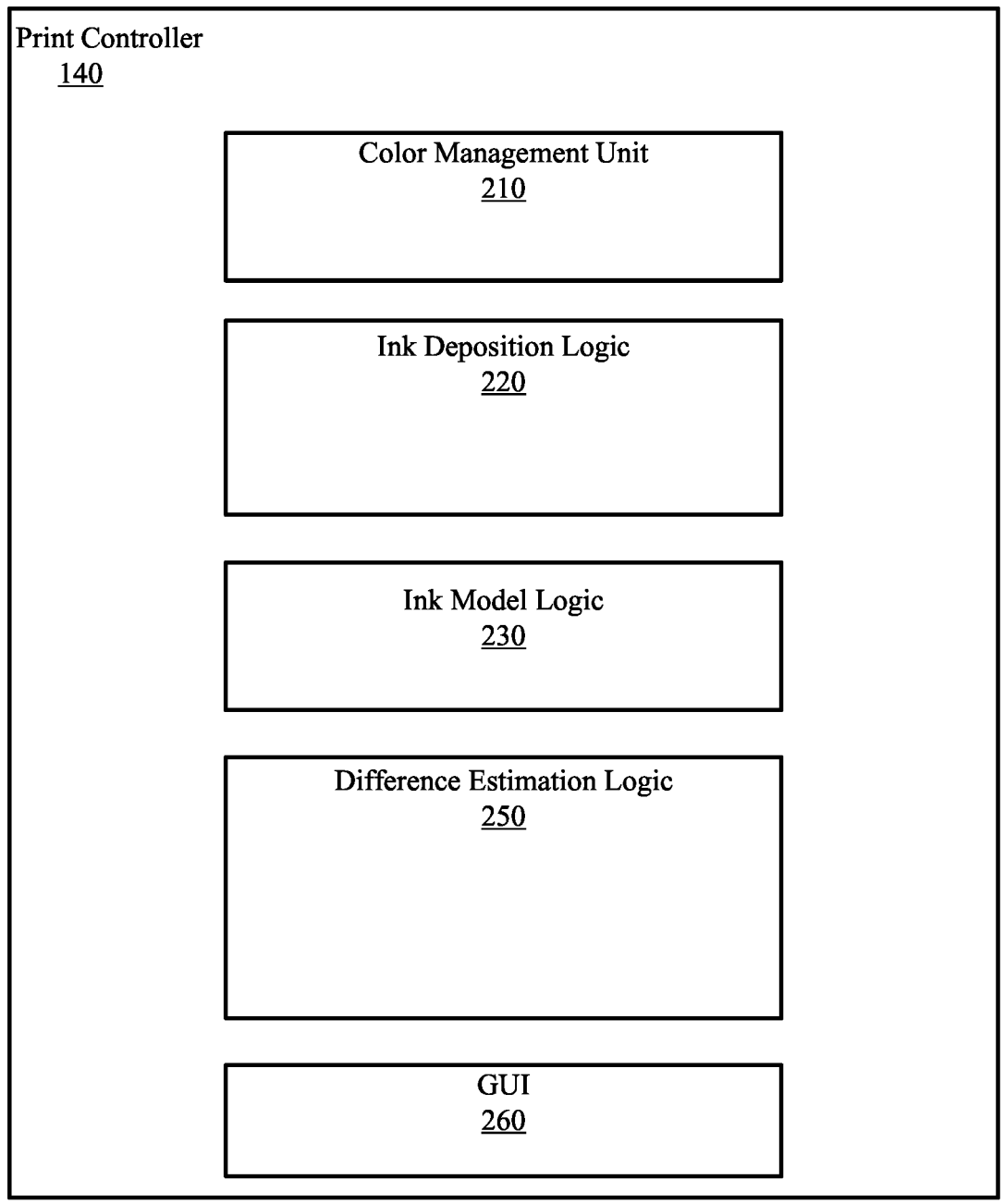
FIGS. 2A&2B illustrate block diagrams of embodiments of a print controller.
Figure 2B:
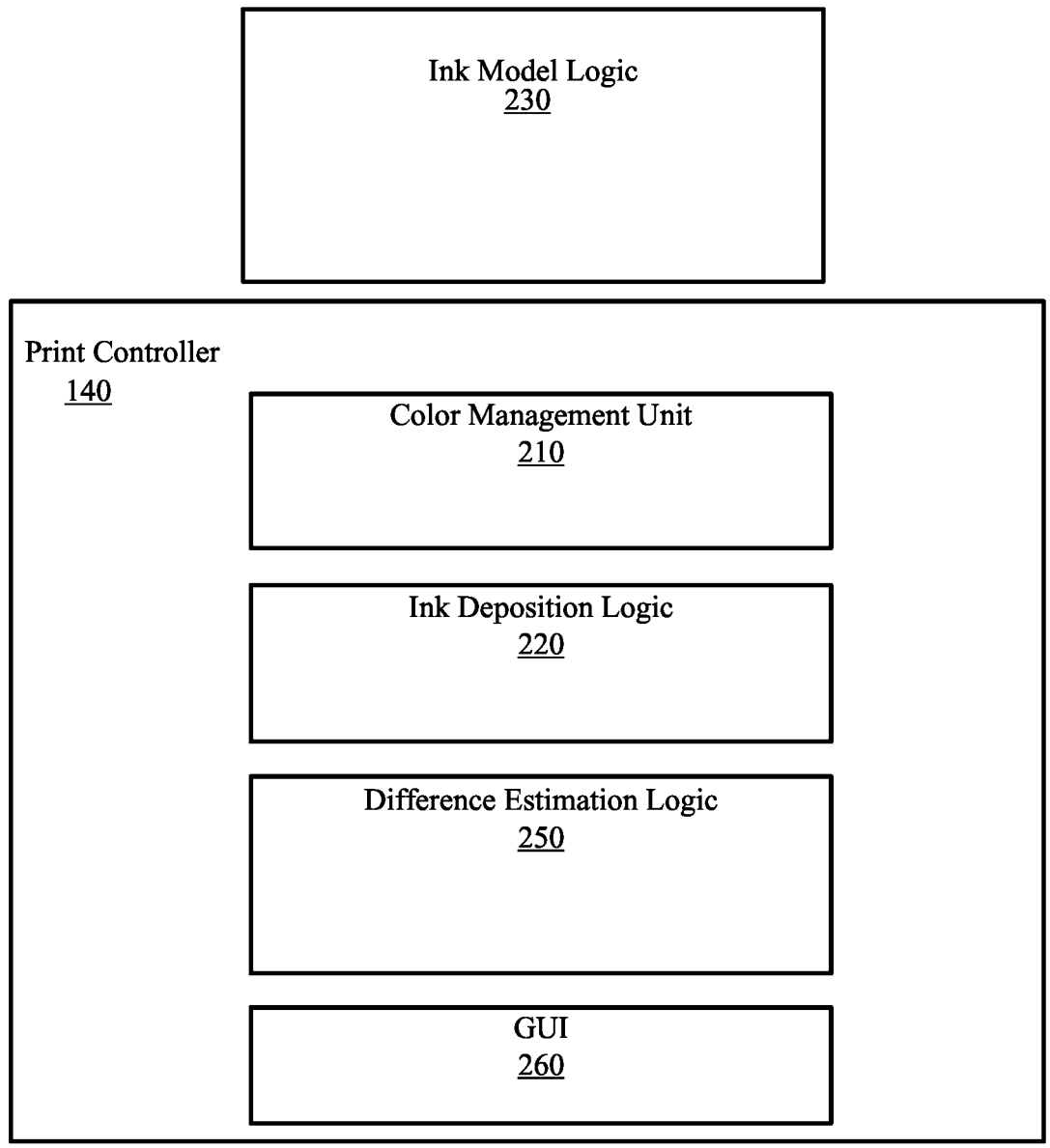

FIGS. 2A&2B illustrate embodiments implementing print controller 140. FIG. 2A illustrates a print controller 140 (e.g., DFE or digital front end), in its generalized form, including color management unit 210 (e.g., color management logic), ink deposition logic 220, ink model logic 230 and difference estimation logic 250. FIG. 2B illustrates an embodiment in which print controller 140 includes color management unit 210, ink deposition logic 220 and difference estimation logic 250, while ink model logic 230 is coupled externally. In either embodiment, the separate components may represent hardware used to implement the print controller 140. Alternatively, or additionally, the separate components may represent logical blocks implemented by executing software instructions in a processor of the printer controller 140.

Figure 2C:
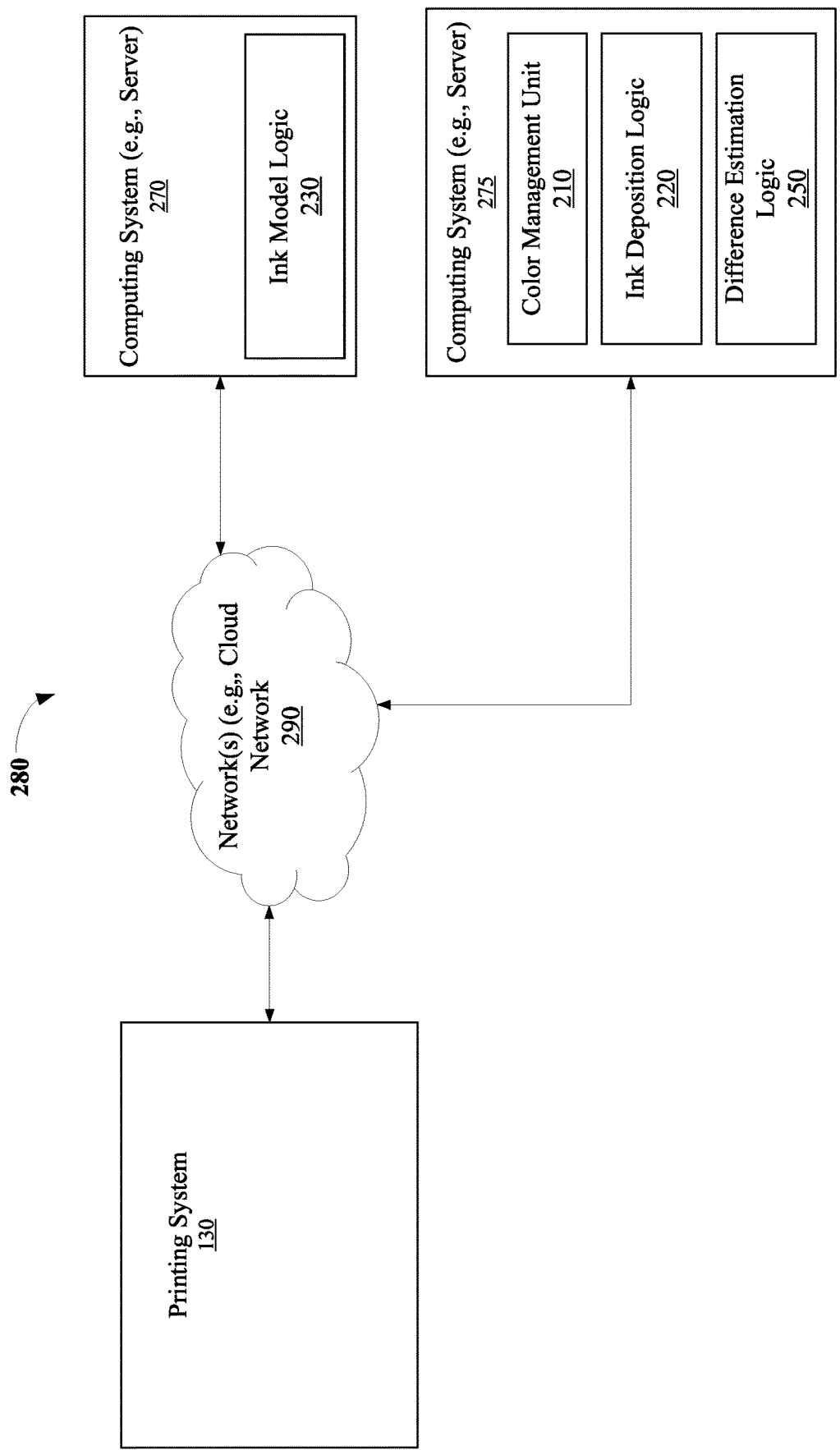
FIG. 2C illustrates another embodiment of a print controller implemented in a network.

Although shown as a component outside of print controller 140, other embodiments may feature one or more of color management unit 210, ink deposition logic 220, ink model logic 230, and difference estimation logic 250 included within independent devices, or combination of devices, communicably coupled to print controller 140. For instance, FIG. 2C illustrates one embodiment of color management unit 210, ink model ink deposition logic 220, estimation logic 230 and difference estimation logic 250 implemented in a network 280. As shown in FIG. 2C, color management unit 210, ink model logic 230 is included in a computing system 270, while ink deposition logic 220 and difference estimation logic 250 are included within a computing system 275. In one embodiment, each component transmits data to printing system 130 via a cloud network 290.

According to one embodiment, color management unit 210 performs color space mapping for printing system 130 based on a received color space mapping profile. In such an embodiment, the color space mapping profile characterizes a relationship between a first color space (e.g., Profile Connection Space) and a color space of printing system 130 (e.g., Device CMYK or printer color space). In a further embodiment, digital count data is received at color management unit 310 as an input control that represents the printing system 130 or printer color space. Thus, color management unit 210 converts the digital count data in the color space of printing system 130 to data in the first color space based on the color space mapping profile.

Figure 3:
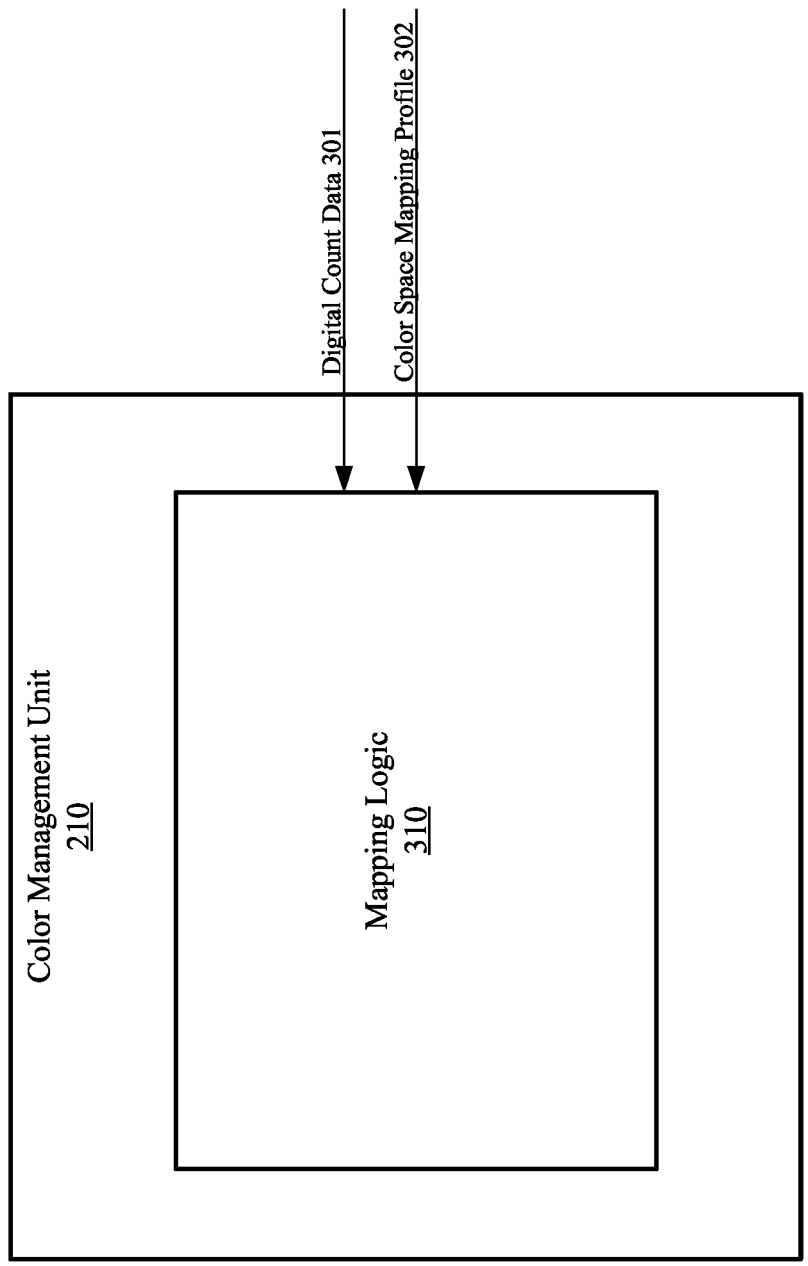
FIG. 3 illustrates one embodiment of color management unit.

FIG. 3 illustrates one embodiment of color management unit 210. As shown in FIG. 3, color management unit 210 includes mapping logic 310 that receives digital count data 301 and color space mapping profile 302 to perform color space conversions. In one embodiment, the color space mapping profile 302 comprises International Color Consortium (ICC) profiles that describe color attributes of a particular device or viewing requirement by defining mappings between a device color space and device independent color space. In such an embodiment, mapping logic 310 converts between device color space (e.g., CMYK) and the profile connection space (PCS) (e.g., CIELAB, CIEXYZ, first color space, etc.). Mapping logic 310 uses color space mapping profile 302 (e.g., a received ICC profile) to map the digital count data 301 (DC_Z) from CMYK colors to CIELAB colors (e.g., to map from digital count data to first color space data)., where Z corresponds to one of the primary colors.

Figure 4:
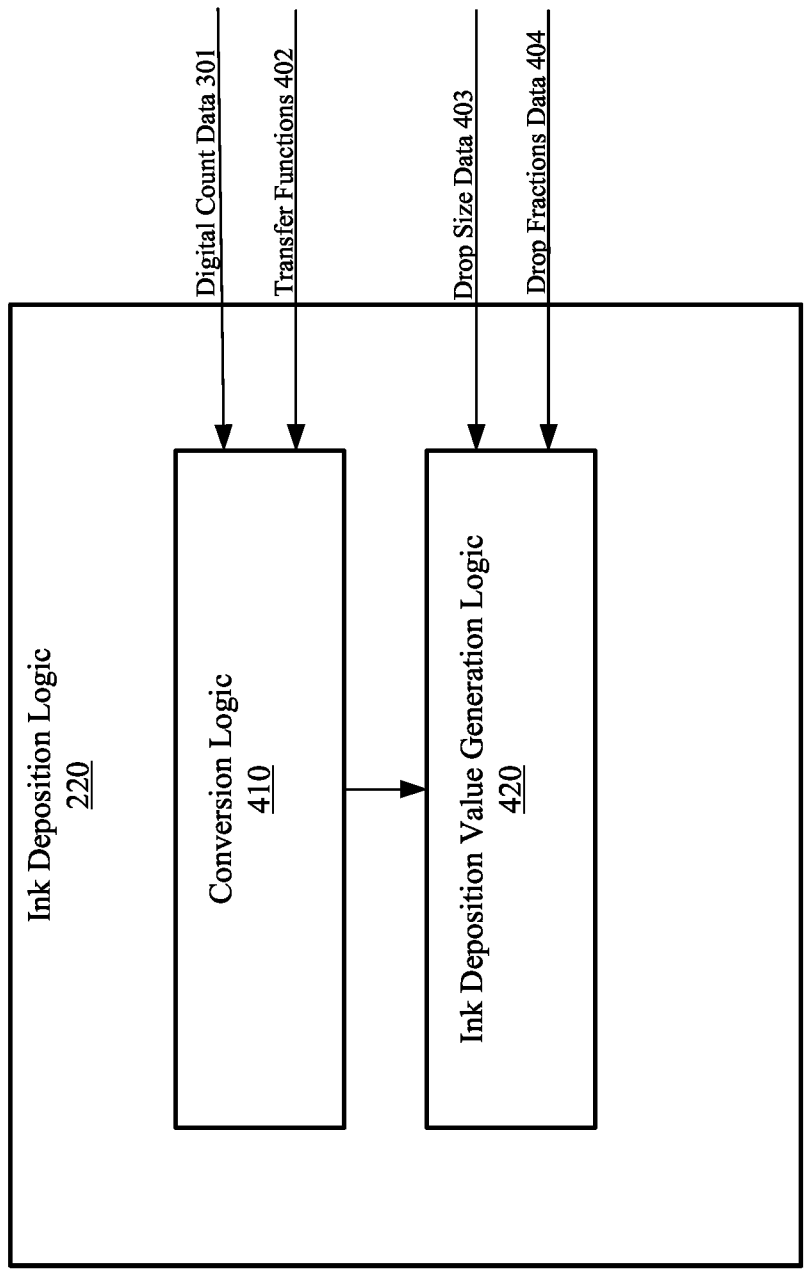
FIG. 4 illustrates one embodiment of ink deposition logic.

Referring back to FIGS. 2, ink deposition logic 220 generates the ink deposition curve for the one of the plurality of the inks based on received transfer functions and received digital count data. FIG. 4 illustrates one embodiment of ink deposition logic 220 including conversion logic 410 and ink deposition value generation logic 420. Conversion logic 410 receives digital count data 301 as well as transfer functions 402 (e.g., calibration transfer functions) and converts the digital count 301 to calibrated digital count data (DCcal_Z) using the transfer functions 402. In one embodiment, a transfer function comprises a mapping of an input digital count (DC_in) to an output digital count (DC_out) for a system, where digital count is the gray level or color value representing the pels in a bitmap 150 (FIG. 1). This mapping is provided for each one of the primary colors to provide a set of calibrated output DC levels for each set of input DC levels forming a set of tuples of uncalibrated and calibrated values. The color space mapping profile that is used is generated with the set of transfer functions applied when the color space mapping profile is created. A technical benefit of calibrated digital count data is that it is adjusted to match the response of a calibrated printing system and any subsequent uses of the calibrated digital count data (e.g., as a basis to generate ink deposition data) incorporate the calibration characteristics. Since printing systems are calibrated from time to time, performing a corresponding calibration of the digital count data maintains the accuracy of the digital count data and all processes that use the digital count data.

Ink deposition value generation logic 420 receives the calibrated digital count data, as well as ink drop size data 403 and ink drop size fractions data 404, and generates an ink deposition curve (ID_Z) associated with each of a plurality of inks (e.g., corresponding to primary color Z) based on the calibrated digital count data for that ink, the ink drop size data 403 and ink drop size fractions data 404. Ink drop size fraction data 404 may be received or otherwise generated from the printing of test print jobs (e.g., printed at printing system 130 and measured at measurement module 190). In one embodiment, ink deposition comprises an amount of one a plurality of inks deposited on a print medium per unit area. Drop size data 403 represents quantitative ink drop amounts corresponding to each instructed ink drop size (e.g., small, medium, large, etc.).

In embodiments, ink drop size data 403 may comprise a volume or a mass expressed in quantities of standardized units (e.g., metric system units such as grams or liters). Ink drop fractions data 404 indicates a percentage of drops for each drop size at each gray level associated with a halftone design, such that a the total number of drops of a specific instructed drop size X at DC=dropFraction_X(DC)* total number of pels in a halftone threshold array (e.g., a halftone design). Ink drop sizes may be determined by analyzing an amount of ink used as measured by 190 and counts of ink drops of each size, where counts are obtained by counting the different drops commanded to drive the pel forming elements 165. Linear regression is employed to determine drop sizes by relating the amount of ink used and the respective drop counts for the same jobs being. Furthermore, drop fractions may be unique for each different primary color due to different halftone threshold arrays.

Figure 5:
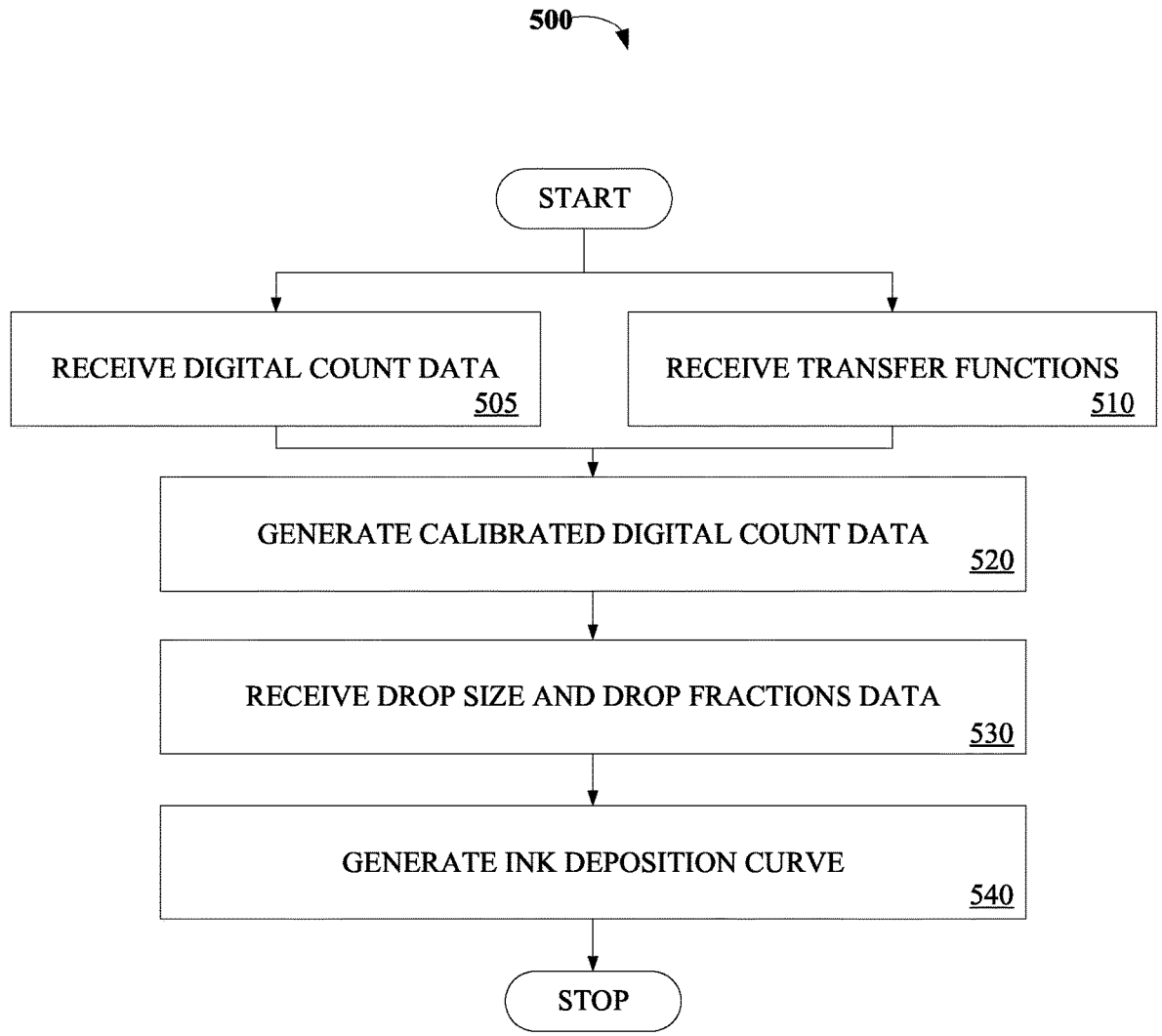
FIG. 5 is a flow diagram illustrating one embodiment of a process for generating an ink deposition curve.

FIG. 5 is a flow diagram illustrating one embodiment of a process 500 for generating an ink model curve. Process 500 may be performed by processing logic that may include hardware (e.g., circuitry, dedicated logic, programmable logic, microcode, etc.), software such as instructions run on a processing device, or a combination thereof. In one embodiment, process 500 is performed by ink deposition logic 220.

Process 500 begins at processing blocks 505 and 510, where digital count data 301 and transfer functions 402 are received. At processing block 520, the calibrated digital count data is generated based on the digital count data 301 and transfer functions 402. At processing block 530, the ink drop size data 403 and ink drop size fractions data 404 are received. At processing block 540, the ink deposition curve is generated for one of the color inks (or each color ink) based on the corresponding calibrated digital count data the ink drop size data 403 and ink drop size fractions data 404. Ink deposition is the amount of ink per unit area. It may be determined based on the previous equation for the total number of drops of a specific drop size X at DC=dropFraction_X(DC)* total number of pels in a halftone threshold array. The number of drops of each size X is determined for each DC level. The DC level used is the calibrated DC level obtained by transforming the DC levels using the transfer functions. At each calibrated DC level, the total amount of ink is computed by summing the ink for all drop sizes and dividing by the area of the threshold array. This provides the calibrated ink deposition used to derive the ink model at each DC level as an amount of ink per unit area. The ink deposition curves define the relationship between the calibrated ink deposition values (e.g., transformed DC levels based on the transfer functions) versus the input DC levels without calibration (e.g., not transformed by the transfer functions).

Another embodiment employs a calibrated halftone. In this case the transfer function is used to generate the calibrated halftone threshold array values (e.g., using Inverse transfer function method). The calibrated halftone is used to determine the drop fractions and ink depositions. The transfer functions become identity transfer functions where DC input=DC output. The color mapping profile used is generated using the calibrated halftones.

Referring to FIGS. 2, ink model logic 230 receives the ink deposition curve for each of the plurality of inks, receives the color space mapping profile and generates a color space ink model for the print system based on the ink deposition curve and the color space mapping profile. In one embodiment, the color space ink model represents a relationship between each of the plurality of parameters of the first color space and ink deposition for the one of the plurality of inks of the print system. In a further embodiment, the color space ink model comprises a set of parametric equations for each of the plurality of parameters of the first color space.

Figure 6:
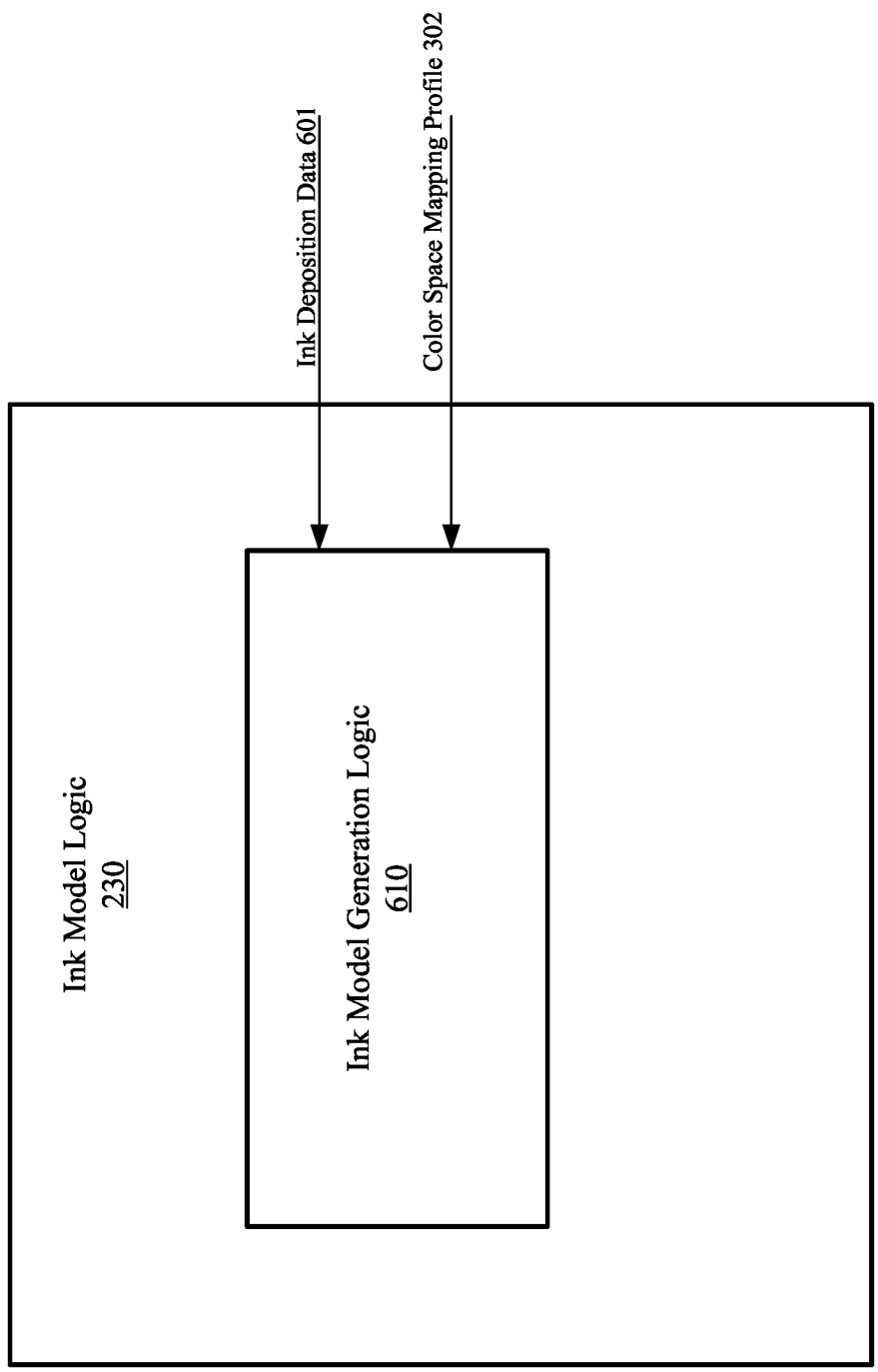
FIG. 6 illustrates one embodiment of ink model logic.

FIG. 6 illustrates one embodiment of ink model logic 230. As shown in FIG. 6, ink model logic 230 includes ink model generation logic 610 that receives ink deposition curves (or ink deposition data) 601 generated at ink deposition logic 220 and a color space mapping profile 302. According to one embodiment, ink model generation logic 610 generates color space ink model parameter data (e.g., $L^*\_Z$, $a^*\_Z$ and $b^*\_Z$ vs ID_Z) for a print system based on the ink deposition data 601 and the color space mapping profile 302 (e.g., ICC profile) for color Z (e.g., Where Z is C, M, Y and Black). In such embodiments, the color space ink model (e.g., a set of parametric equations) represents a relationship between parameter values in a color space and ink deposition. The color space ink model parameter data may be determined based on a numerical analysis (e.g., regression, interpolation, and/or etc.) of values of the ink deposition curve and values of the color space mapping profile.

In further embodiments, the ink deposition data (e.g., ink deposition curve) represents a relationship between ink deposition and a print system input control (e.g., digital count, gray level, percent dot, etc.), and the color space mapping profile represents a relationship between color space parameters (e.g., $L^*$, $a^*$ or $b^*$ for CIELAB color space) and the print system input control (e.g., digital control data in the printer color space).

As used herein, ink deposition is defined as an average amount of ink deposited per printed device pel, where a pel is a picture element of the printer 160 (e.g., the printing device). Print device pel physical spacing may be readily converted to an area and ink deposition may also alternatively expressed as amount of ink deposited per area. The print system input control comprises a digital count that is a gray level representing the pels in bitmap 150. In one embodiment, the amount of ink deposition changes as a function of print system input control (e.g., digital count, gray level, percent dot, etc.). In such an embodiment, the digital count for pels in bitmap 150 range from 0-255 for a typical 8-bit system. Additionally, the digital count is a control parameter of an output pel. As discussed above, the ink deposition data is represented as an ink deposition curve, which defines the ink deposition over the range of all possible gray levels (e.g., 0-255). In such an embodiment, ink deposition may be computed on an average basis to eliminate local variations due to halftoning using a set of discrete ink drop sizes.

As mentioned above, the color space mapping profile comprises CIELAB color space (or CIE L*e*b*) parameters. However, in other embodiments, other color spaces (e.g., CIEXYZ) with a plurality of color s parameters may be implemented. By generating a color space ink model that is based on the parameters of the first color space (e.g., CIEIAB), the ink deposition data for the printer color space (e.g., CMYK) and the digital count data for the printer color space, the color space ink model may be efficiently determined as shown below.

In one embodiment, color space ink model parameter data comprises parameter estimates that are generated by applying an ink model, such as a Weibull ink model regression, to create a relationship between first color space parameters (e.g., CIELAB color space parameters) and ink deposition data. Weibull cumulative distribution function (CDF) describes the probability that a real-valued random variable X with a given probability will be found at a value less than or equal to x (where x is a one possible value of the random variable X). Intuitively, it is the "area under the curve" function of the probability density function (PDF). Cumulative distribution functions are also used to specify the distribution of multivariate random variables. In a further embodiment, the color space ink model is generated based on evaluating the ink deposition curves and the first color space mapping profile with digital count values from the printer color space.

In one embodiment, the Weibull CDF is modified to describe a quantity of ink deposition that is required to achieve specific L*, a*, b* (or (Lab)) values. This modified Weibull CDF will be described as simply "Weibull CDF". The forward Weibull CDF relates ink deposition to Lab, while the inverse Weibull CDF relates Lab to ink deposition.

In one embodiment, the Weibull CDF models L* vs ink deposition as:

$$L^* = \left(p(3) * \left(1 - e^{-\left(\frac{x}{p(1)}\right)^{p(2)}}\right)\right) + p(4)$$

Meanwhile a fourth order polynomial is implemented to model a* or b* vs ink deposition, such that:

$$a^* = (p(5)*x^4) + (p(6)*x^3) + (p(7)*x^2) + (p(8)*x) + p(9); \text{ and}$$

$$b^* = (p(10)*x^4) + (p(11)*x^3) + (p(12)*x^2) + (p(13)*x) + p(14), \text{ where}$$

Land a* are CIE Lab L* and a* respectively; x is the ink deposition (e.g., mg per square inch); p(1) is the Weibull scale parameter, p(2) is a Weibull slope parameter; p(3) is a solid area/infinite ink deposition L* parameter; p(4) is a Paper L*; p(5) is a fourth order parameter for a*; p(6) is a third parameter for a*; p(7) is a second parameter for a*; p(8) is a linear parameter for a*; p(9) is a constant parameter for a*; b* is CIE Lab b*; x is the ink deposition (e.g., mg per square inch); p(10) is a fourth order parameter for b*; p(11) is a third parameter for b*; p(12) is a second parameter for b*; p(13) is a linear parameter for b*; and p(14) is a constant parameter for b*. For generating the L* Weibull ink model, an exponential regression is performed, such that $$L^* = W(i) = M(ID^{-1}(i)), \text{ where}$$

ID(g) is a calibrated ink deposition function of gray level g; $ID^{-1}$ (i) is a calibrated ink deposition inverse function of ink deposition level i; M(g) is L*as a function of gray level g obtained from the color mapping profile; and W is the ink model, W(i) as a function of ink deposition i, which relates L* to ink deposition. As referred to herein, a gray level is synonymous with a digital count. The inverse relationship can be used to determine the ink deposition from the L* values, as represented as:

$$W^{-1}(L^*) = ID(M^{-1}(L^*))$$

Figure 7A:
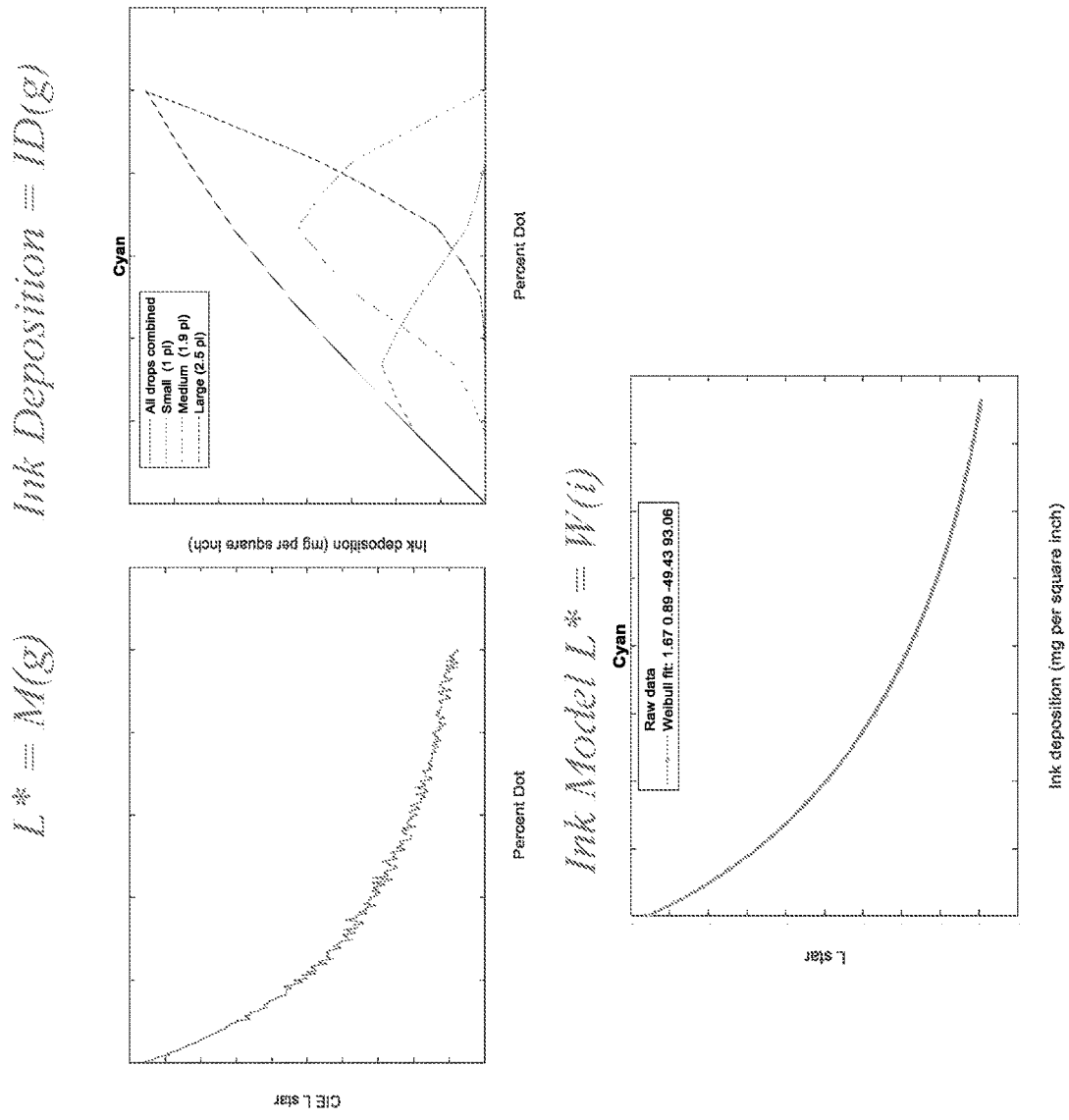
FIGS. 7A-7C illustrate embodiment of graphs showing ink models and associated parameters.

FIG. 7A illustrates one embodiment of graphs showing the L* Weibull ink model, and parameters L* and ink deposition.

For generating the a* ink model, a fourth order regression model used to fit the ink model W to a*, such that:

$$a^* = W(i) = M(ID^{-1}(i)), \text{ where}$$

M(g) represents the a* as a function of gray level g obtained from the color mapping profile. This forms the second equation in the set of parametric ink model equations. The inverse relationship can be used to determine the ink deposition from the a* values, as represented as:

$$W^{-1}(a^*) = ID(M^{-1}(a^*))$$

Figure 7B:
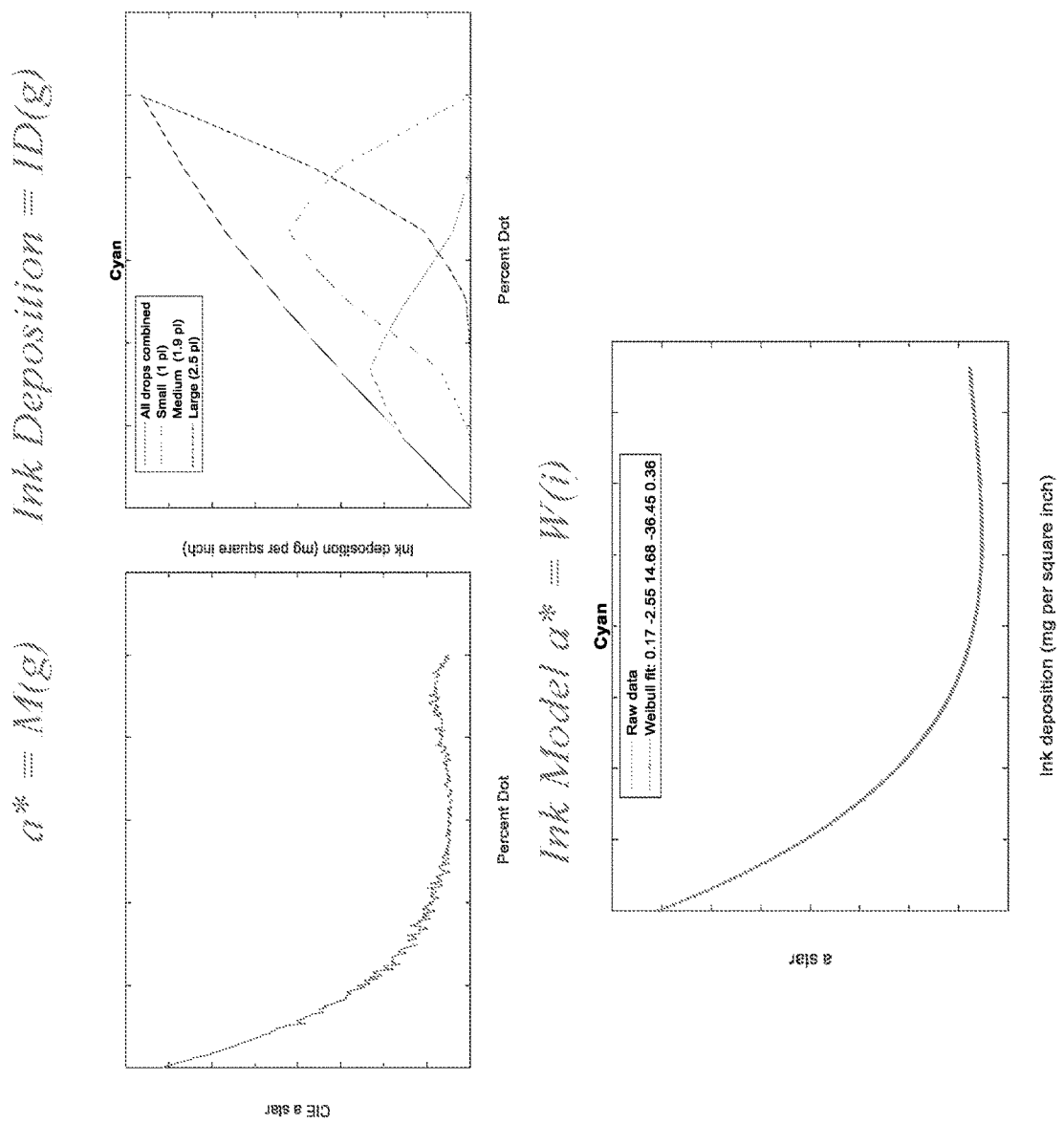

FIG. 7B illustrates one embodiment of graphs showing the a* ink model, and parameters a* and ink deposition.

For generating the b* ink model, a fourth order regression model used to fit the ink model W to b*, such that:

$$b^* = W(i) = M(ID^{-1}(i)), \text{ where}$$

M(g) represents the b* as a function of gray level g obtained from the color mapping profile. This forms the third equation in the set of parametric ink model equations. The inverse relationship can be used to determine the ink deposition from the b* values, as represented as:

$$W^{-1}(b^*) = ID(M^{-1}(b^*))$$

Figure 7C:
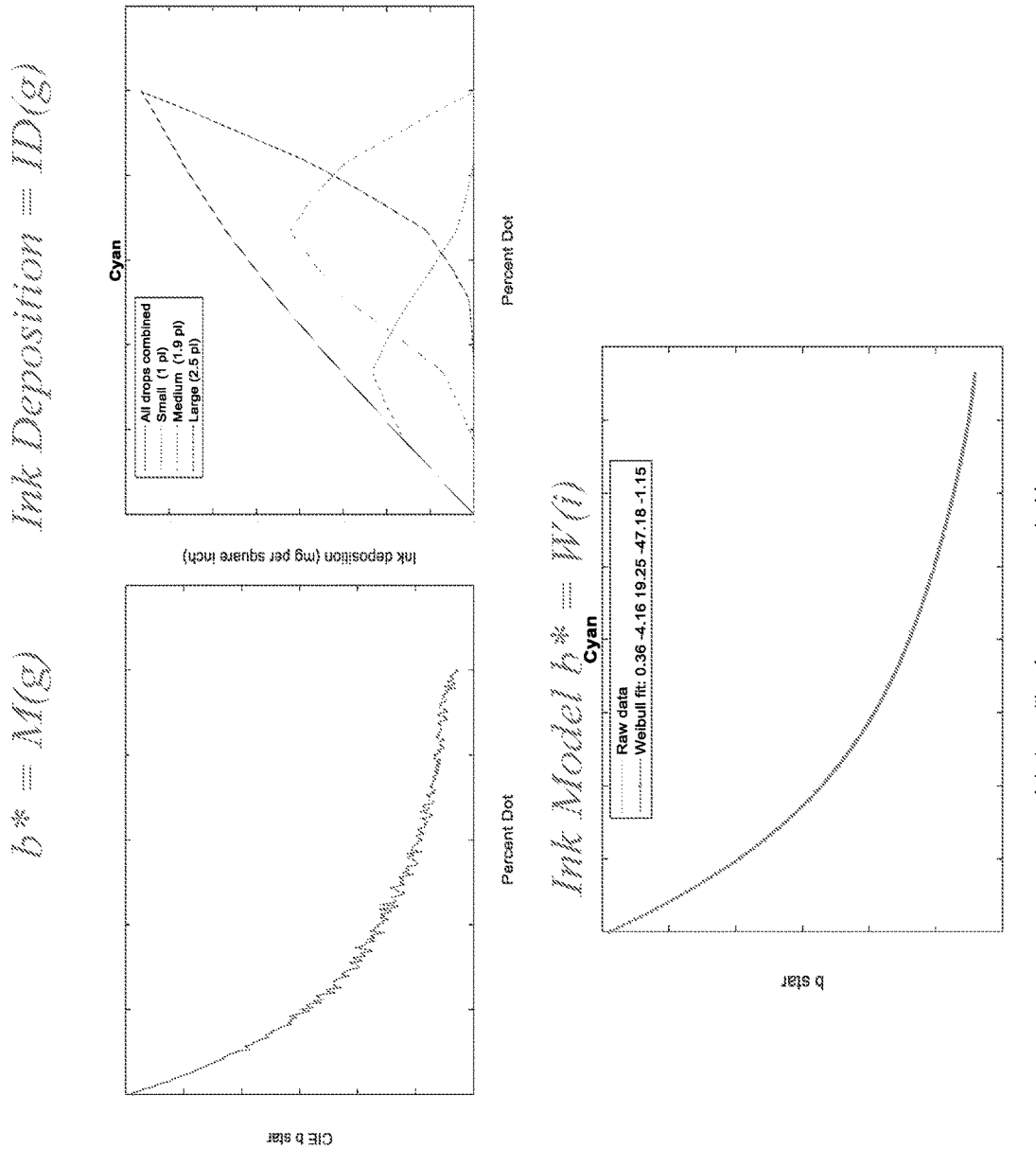

FIG. 7C illustrates one embodiment of graphs showing the b* Weibull ink model, and parameters b* and ink deposition. Note that the relationships are defined by a set of parametric equations, therefore a triplet of color values are associated with a single level of ink deposition. Using any of the inverse relationships for a single given color parameter produces a corresponding level of ink deposition. That ink deposition level can then be used to find the two additional color parameters. Furthermore, multiple levels of ink deposition may be predicted by the inverse relationships. This can be observed in FIG. 7B for a*.

Figure 8:
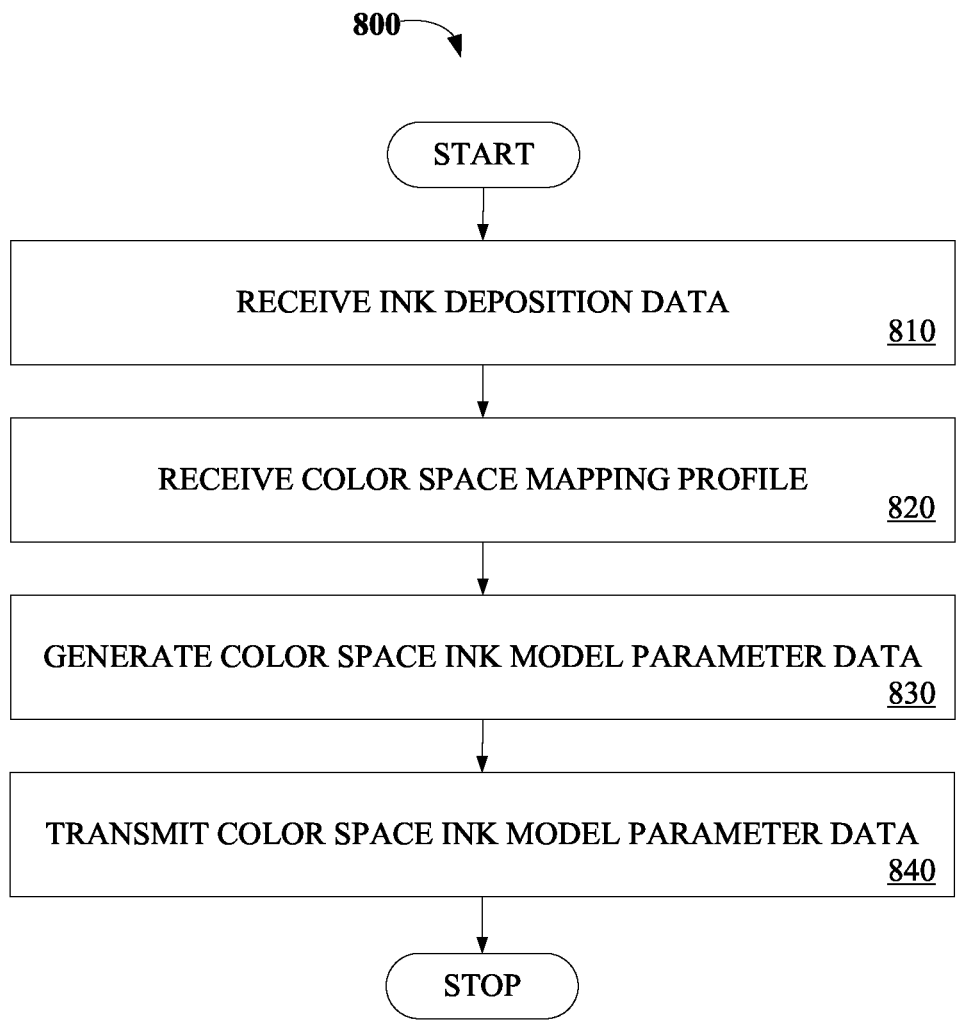
FIG. 8 is a flow diagram illustrating one embodiment of an ink model computation process.

FIG. 8 is a flow diagram illustrating one embodiment of a process 800 for performing an ink model computation. Process 800 may be performed by processing logic that may include hardware (e.g., circuitry, dedicated logic, programmable logic, microcode, etc.), software such as instructions run on a processing device, or a combination thereof. In one embodiment, process 800 is performed by ink model logic 230.

Figure 9A:
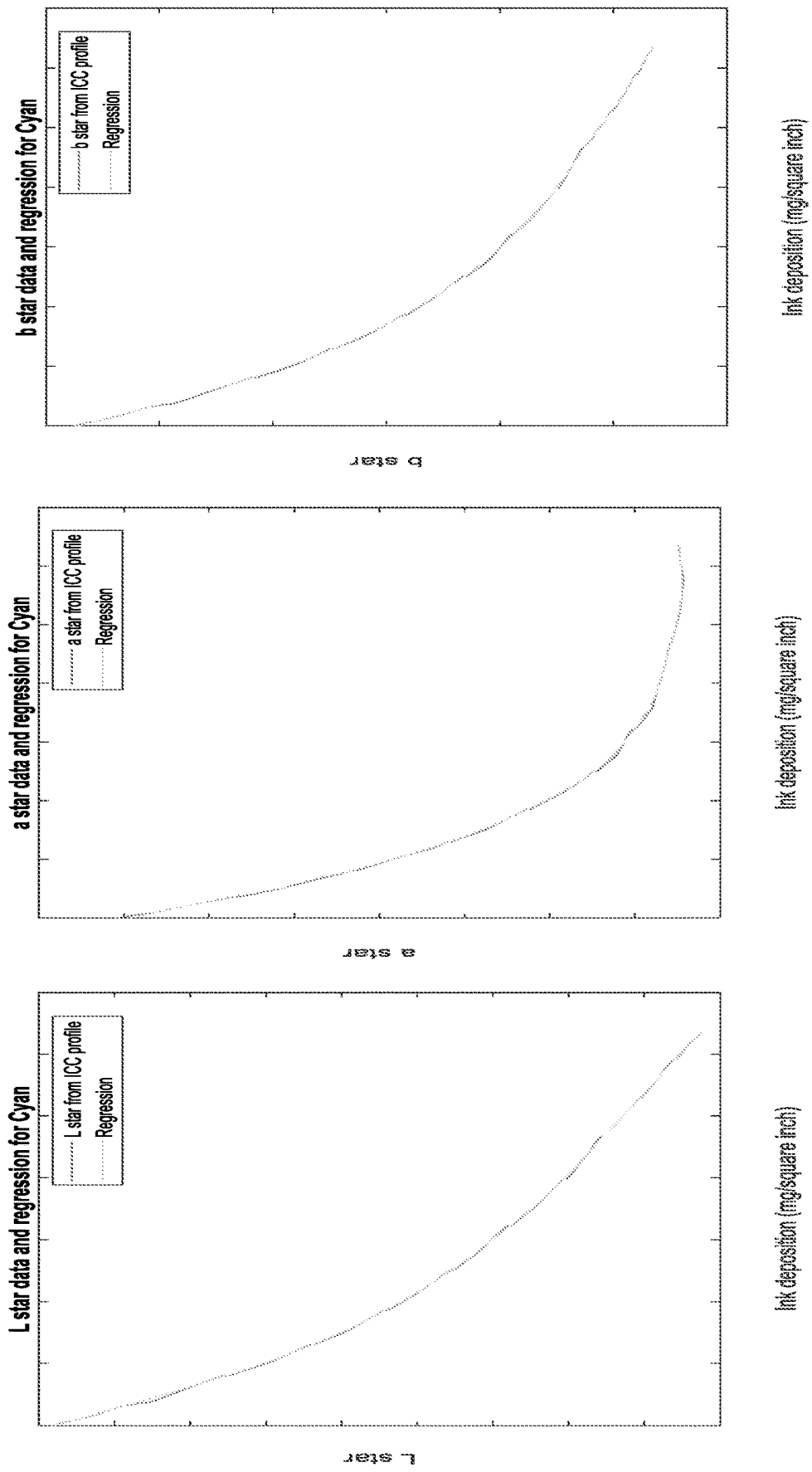
FIGS. 9A & 9B illustrate embodiments of graphs showing generated ink models.
Figure 9B:
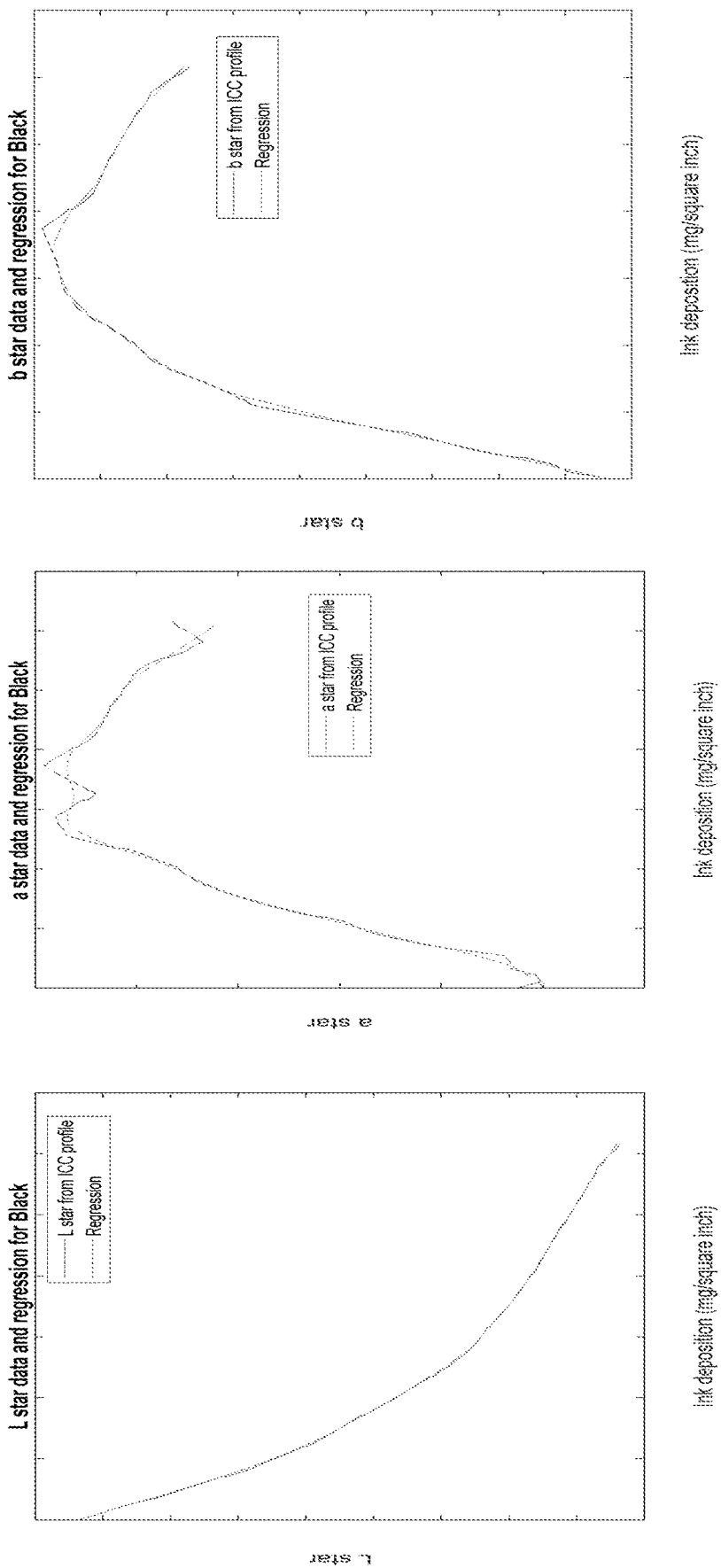

According to one embodiment, process 800 begins at processing block 810, where ink deposition data is received. At processing block 820, color space mapping profiles (e.g., CIELAB) are received. At processing block 830, color space ink model parameter data is generated for one on the color inks (or all of the color inks) by applying the L*, a* and b* models to the first color space data and corresponding ink deposition data. As explained above, the first color space data may be determined based on digital count data 301 and color space mapping profile 302. At processing block 840, the color space ink model parameter data is transmitted. Other systems (e.g., printing system 130, etc.) communicably coupled to ink model logic 230 may receive and evaluate the color space model parameter data (e.g., to determine ink deposition differences related to Delta E for two different input colors, determine ink usage, etc.). FIGS. 9A & 9B illustrate embodiments of graphs showing generated ink models. FIG. 9A shows a CIELAB ink model for cyan, while FIG. 9B shows a CIELAB ink model for black. In FIGS. 9A and B, cubic spline regressions were used to generate the ink model graphs instead of the Weibull and polynomial equations. Cubic interpolating splines provide an alternative method to the closed form solutions given by the equations. Cubic splines can provide smooth piecewise continuous estimations of the functions through the data points that can accurately fit the data without having to verify the results visually. Furthermore, they can easily represent data that is nonmonotonic in nature, such as that seen in cases of a* and b* and even in some cases L*. Local polynomial regression methods such as LOESS and LOWESS can also be employed to provide smooth the data using a span parameter that can adjust the smoothness of the data and the resulting curves.

While the ink models are described as being formed from tuples of ink deposition and color parameter values using the gray levels 0-255, this is not a requirement. Employing regressions such as the ones just mentioned, a continuous function can be derived from any set of DC data for the ink deposition and another continuous function can be derived from a different set of DC data for the color parameters obtained from the color mapping profile. The resulting continuous functions for ink deposition and color parameters may then be used in the ink model equations provided previously to solve for each individual continuous function that form the parametric set of equations for W that describe L*, a* and b*.

The above-described process discloses an ink model generated for primary colors. However, in other embodiments, ink model logic 230 may generate ink models for secondary colors. In this embodiment, the ink models are generated using a mixture of primary colors. Accordingly, ink model logic 230 receives a plurality of ink deposition curves each associated with one of a plurality of primary color inks of a print system, wherein the associated primary color inks in combination represent a secondary color (e.g., a first secondary color), receives a color space mapping profile and generates a color space ink model for the secondary color for the print system based on the plurality of ink deposition curves and the color space mapping profile. A technical benefit of extending the ink models to secondary colors is to enable a more accurate analysis of ink deposition related to secondary colors. Similarly, ink model logic 230 may additionally generate a color space ink model for a different secondary color (e.g., a second secondary color) based on a plurality of corresponding ink deposition curves (e.g., the corresponding ink deposition curves for the second secondary color are each associated with one of a plurality of primary color inks of the print system wherein the associated primary color inks in combination represent the second secondary color) and the color space mapping profile. The one or more target secondary colors may be selected (e.g., via GUI 260) and the corresponding primary colors determined based on the selected secondary color (e.g., by decomposing the secondary colors).

In a further embodiment, the digital count data 301 is received at color management unit 210 for multiple primary colors (e.g., a first primary color DC_A and a second primary color DC_B) in order to generate a secondary color mixture of primary colors (e.g., AB where A is one primary color and B is a different primary color). In this embodiment, mapping logic 310 within color management unit 210 uses color space mapping profile 302 (e.g., including primary colors X and Y) to map the digital count data 301 (DC_A and DC_B)) from CMYK colors to CIELAB colors (e.g., determine first color space data based on digital count data 301 and color space mapping profile 302).

Additionally, conversion logic 410 within ink deposition logic 220 receives DC_A and DC_B digital count data 301, as well as transfer functions 402 for A and B to convert the digital count 301 to calibrated digital count data (DCcal_A and DCcal_B) using the transfer functions 402. Ink deposition value generation logic 420 generates ink deposition curves (ID_A and ID_B vs. DC_A and DC_B) associated with ink combination based on the calibrated digital count data, the ink drop size data 403 and ink drop size fractions data 404 as previously described. Ink model generation logic 610 then generates a set of parametric equations for the secondary color space (AB) based ink model parameter data (e.g., L*_AB, a*_AB and b*_AB vs ID_A and ID_B and ID_A+ID_B) based on ink deposition data 601 and the color space mapping profile 302. According to one embodiment, this process is repeated for each secondary color (or AB pair) in the color space. The AB pair may have some relationship such as a mixture having equal A and B values.

Figure 10:
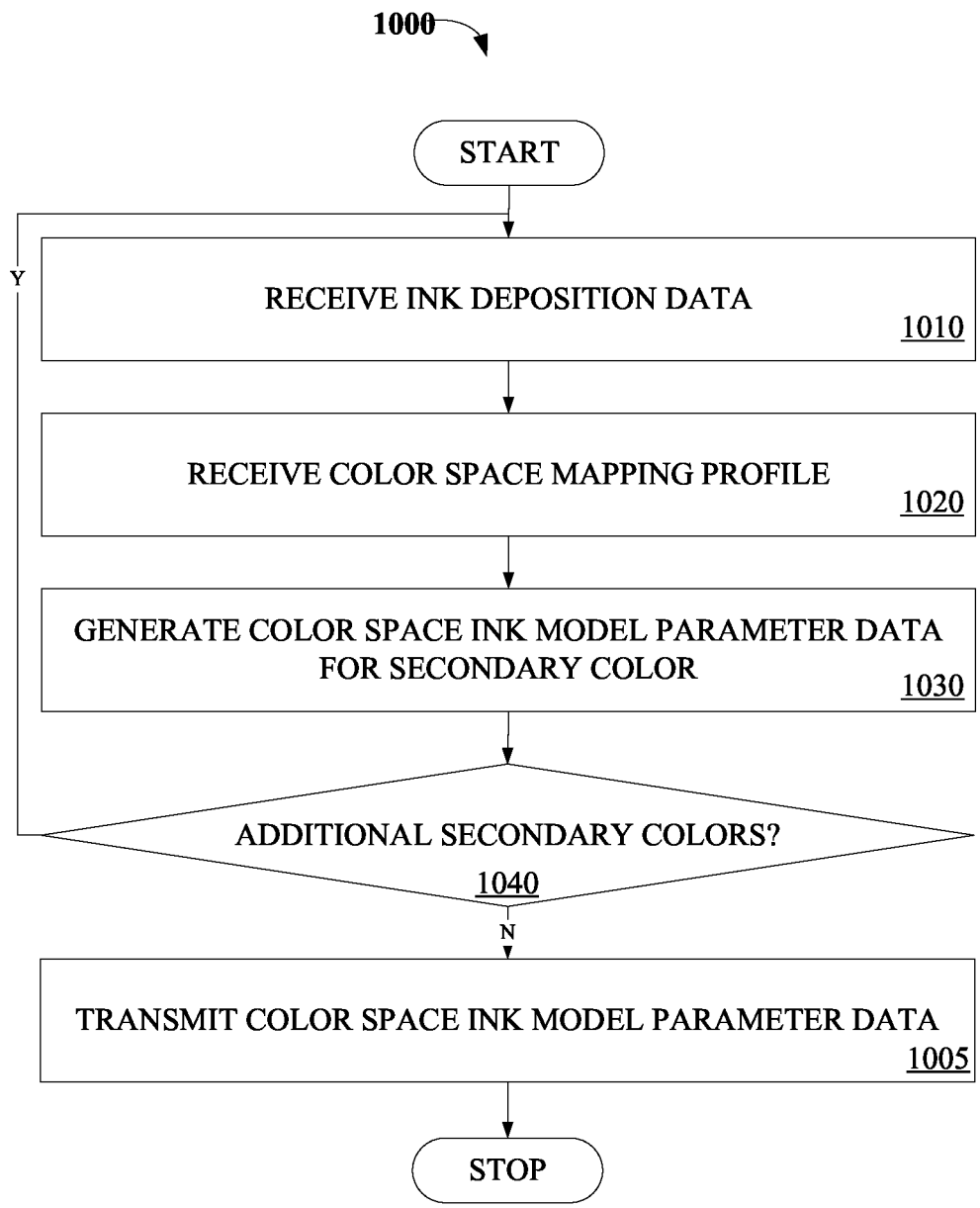
FIG. 10 is a flow diagram illustrating another embodiment of an ink model computation process.

FIG. 10 is a flow diagram illustrating another embodiment of an ink model computation process 1000 for secondary colors. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by ink model logic 230.

Figure 11:
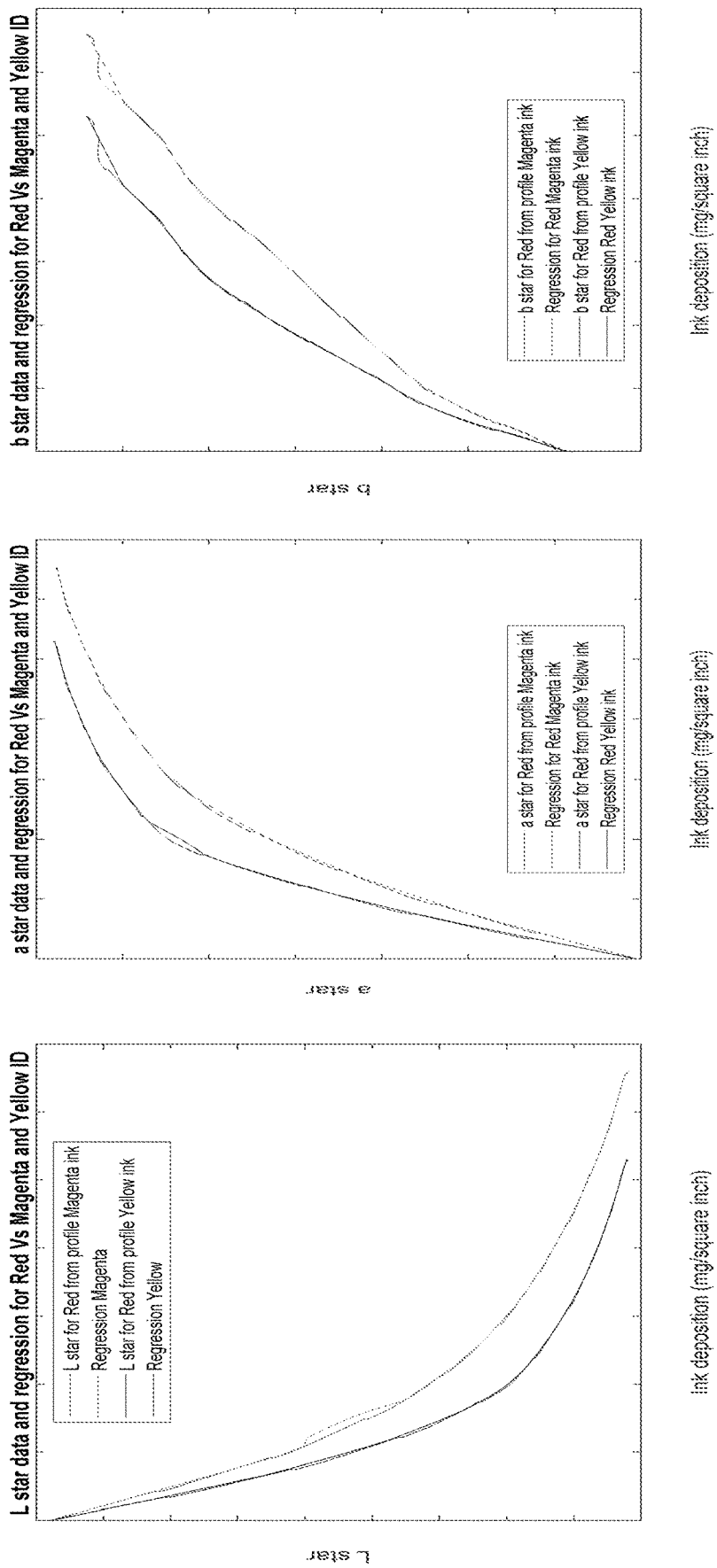
FIG. 11 illustrates another embodiment of graphs showing generated ink models.

According to one embodiment, process 1000 begins at processing block 1010, where ink deposition data is received. At processing block 1020, color space mapping profile is received. At processing block 1030, color space ink model parameter data for secondary colors (e.g., a first secondary color) is generated by applying the L*, a* and b* models to the first color space data (e.g., color space values) and ink deposition data. As explained above, the first color space data may be determined based on digital count data 301 and color space mapping profile 302. At decision block 1040, a determination is made as to whether there are additional secondary colors (e.g., a second secondary color) for which an ink model is to be generated. If so, control is returned to processing block 1010, where the process is repeated for another (e.g., a different) secondary color comprising a pair (e.g., a different pair) of primary colors AB. Otherwise, the color space ink model parameter data is transmitted at processing block 1040. FIG. 11 illustrates one embodiment of a CIELAB ink model for a red (e.g., R) secondary color. This process generates a set of six parametric equations since each color parameter will have two different ink depositions, corresponding to the depositions for each primary color.

In alternative embodiment, an ink model may be generated for a secondary color having a specific hue angle. In this embodiment, a set of CIELAB colors along a constant hue angle spoke (e.g., input colors) are defined. Thus, color management unit is implemented to use BtoA3 (e.g., Profile connection space to device transform) to convert the input colors to digital count data 301 to obtain each primary component for Cyan, Magenta, Yellow and Black (e.g., DC_C, DC_M, DC_Y and DC_K). Similar to discussed above, ink deposition logic 220 transforms the digital count data 301 using transfer functions associated with each primary color to generate the calibrated digital count data e.g., DCcal_C, DCcal_M, DCcal_Y and DCcal_K), which is used to generate the ink deposition curves for each primary color (ID_C, ID_M, ID_Y and ID_K vs. DCcal_C, DCcal_M, DCcal_Y and DCcal_K) included in the secondary color.

Subsequently, ink model logic 230 uses the CIELAB colors along a constant hue angle spoke and ink deposition data for each color to define a set of parametric equations. In this embodiment, twelve total equations are defined, three for each color. The final set of parametric equations describe: $L^*$ vs ID_C, $a^*$ vs ID_C, $b^*$ vs ID_C, $L^*$ vs ID_M, $a^*$ vs ID_M, $b^*$ vs ID_M, $L^*$ vs ID_Y, $a^*$ vs ID_Y, $b^*$ vs ID_Y, $L^*$ vs ID_K, $a^*$ vs ID_K, and $b^*$ vs ID_K.

Referring back to FIGS. 2, difference estimation logic 250 receives ink deposition data and associated color data and determines color differences (Delta E) and/or ink deposition differences (Delta IDs) for a plurality of color values. In one embodiment, difference estimation logic 250 stores each color value and associated ink deposition data received from ink deposition logic 220 as color samples. In such an embodiment, an operator (or user) may select two or more color samples (e.g., via a graphical user interface (GUI) 260 at print controller 140) to perform a difference analysis.

Once selected, difference estimation logic 250 performs the difference analysis by comparing the color data and/or ink deposition data for each sample and generating Delta E (e.g., Delta E 2000) and/or Delta ink depositions (Delta IDs) between the color samples. In one embodiment, the Delta Es and/or Delta IDs are displayed via GUI 260. However, in other embodiments, the Delta Es and/or Delta IDs are transmitted to another entity. By determining Delta Es and/or Delta IDs based on ink deposition for the input color samples, the differences between the input color samples may be efficiently determined.

Figure 12:
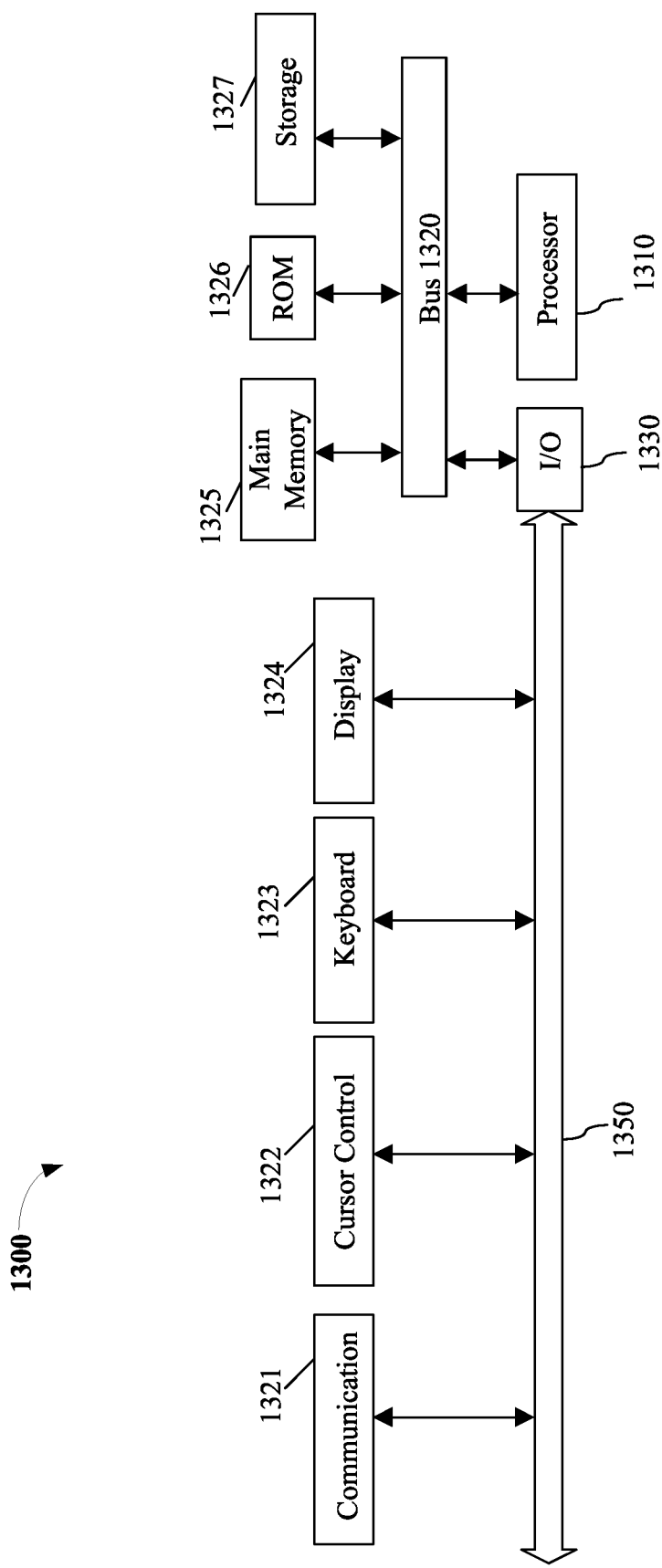
FIG. 12 illustrates one embodiment of a computer system.

FIG. 12 illustrates a computer system 1300 on which printing system 130, print controller 140, computing system 270 and/or computing system 275 may be implemented. Computer system 1300 includes a system bus 1320 for communicating information, and a processor 1310 coupled to bus 1320 for processing information.

Computer system 1300 further comprises a Random Access Memory (RAM) or other dynamic storage device 1325 (referred to herein as main memory), coupled to bus 1320 for storing information and instructions to be executed by processor 1310. Main memory 1325 also may be used for storing temporary variables or other intermediate information during execution of instructions by processor 1310. Computer system 1300 also may include a read only memory (ROM) and or other static storage device 1326 coupled to bus 1320 for storing static information and instructions used by processor 1310.

A data storage device 1327 such as a magnetic disk or optical disc and its corresponding drive may also be coupled to computer system 1300 for storing information and instructions. Computer system 1300 can also be coupled to a second I/O bus 1350 via an I/O interface 1330. A plurality of I/O devices may be coupled to I/O bus 1350, including a display device 1324, an input device (e.g., an alphanumeric input device 1323 and or a cursor control device 1322). The communication device 1321 is for accessing other computers (servers or clients). The communication device 1321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes at least one physical memory device to store ink model logic and one or more processors coupled with the at least one physical memory device to execute the ink model logic to receive a first plurality of ink deposition curves each associated with one of a plurality of primary color inks of a print system, wherein the associated primary color inks in combination represent a first secondary color, receive a color space mapping profile for the print system, wherein the color space mapping profile characterizes a relationship between a first color space and a printer color space of the print system and generate a color space ink model for the first secondary color based on the first plurality of ink deposition curves and the color space mapping profile, wherein the color space ink model represents a relationship between each of a plurality of parameters of the first color space and ink deposition.

Example 2 includes the subject matter of Example 1, wherein the first plurality of ink deposition curves represent a relationship between the ink deposition and digital count data for the printer color space.

Example 3 includes the subject matter of Examples 1 and 2, wherein the ink model logic further to receive a second plurality of ink deposition curves each associated with one of a plurality of primary color inks of the print system, wherein the associated primary color inks in combination represent a second secondary color different than the first secondary color and generate a color space ink model for each of the first secondary color and the second secondary color based on corresponding ink deposition curves and the color space mapping profile.

Example 4 includes the subject matter of Examples 1-3, further comprising at least one physical memory device to store ink deposition logic and one or more processors coupled with the at least one physical memory device to execute the ink deposition logic to receive the digital count data for the printer color space, receive one or more calibration transfer functions associated with the print system, generate calibrated digital count data by applying the one or more calibration transfer functions to the digital count data, and generate the first plurality of ink deposition curves based on the calibrated digital count data.

Example 5 includes the subject matter of Examples 1-4, wherein the ink deposition logic further to receive drop size data, receive drop fractions data and generate the first plurality of ink deposition curves based on the drop size data, the drop fractions data and the calibrated digital count data.

Example 6 includes the subject matter of Examples 1-5, wherein the ink deposition comprises an amount of ink deposited on a print medium per unit area.

Example 7 includes the subject matter of Examples 1-6, further comprising at least one physical memory device to store color management logic and one or more processors coupled with the at least one physical memory device to execute the color management logic to receive the digital count data for the printer color space, and convert the digital count data to first color space data in the first color space based on the color space mapping profile, wherein the ink deposition logic further to generate the color space ink model based on the first color space data.

Example 8 includes the subject matter of Examples 1-7, wherein the color space ink model comprises at least one parametric equation for each of the plurality of parameters of the first color space.

Example 9 includes the subject matter of Examples 1-8, further comprising at least one physical memory device to store difference estimation logic and one or more processors coupled with the at least one physical memory device to execute the difference estimation logic to determine an ink deposition difference corresponding to a specific Delta E for a pair of input values of the color space for the print system based on the color space ink model.

Example 10 includes the subject matter of Examples 1-9, further comprising a print controller.

Some embodiments pertain to Example 11 that includes a method comprising receiving a first plurality of ink deposition curves each associated with one of a plurality of primary color inks of a print system, wherein the associated primary color inks in combination represent a first secondary color, receiving a color space mapping profile for the print system, wherein the color space mapping profile characterizes a relationship between a first color space and a printer color space of the print system and generating a color space ink model for the first secondary color based on the first plurality of ink deposition curves and the color space mapping profile, wherein the color space ink model represents a relationship between each of a plurality of parameters of the first color space and ink deposition.

Example 12 includes the subject matter of Example 11, wherein the first plurality of ink deposition curves represent a relationship between the ink deposition and digital count data for the printer color space.

Example 13 includes the subject matter of Examples 11 and 12, further comprising receiving a second plurality of ink deposition curves each associated with one of a plurality of primary color inks of the print system, wherein the associated primary color inks in combination represent a second secondary color different than the first secondary color and generating a color space ink model for each of the first secondary color and the second secondary color based on corresponding ink deposition curves and the color space mapping profile.

Example 14 includes the subject matter of Examples 11-13, further comprising receiving the digital count data for the printer color space, receive one or more calibration transfer functions associated with the print system, generating calibrated digital count data by applying the one or more calibration transfer functions to the digital count data and generating the first plurality of ink deposition curves based on the calibrated digital count data.

Example 15 includes the subject matter of Examples 11-14, further comprising receiving drop size data, receiving drop fractions data and generating the first plurality of ink deposition curves based on the drop size data, the drop fractions data, and the calibrated digital count data.

Some embodiments pertain to Example 16 that includes at least one computer readable medium having instructions stored thereon, which when executed by one or more processors, cause the processors to receive a first plurality of ink deposition curves each associated with one of a plurality of primary color inks of a print system, wherein the associated primary color inks in combination represent a first secondary color, receive a color space mapping profile for the print system, wherein the color space mapping profile characterizes a relationship between a first color space and a printer color space of the print system and generate a color space ink model for the first secondary color based on the first plurality of ink deposition curves and the color space mapping profile, wherein the color space ink model represents a relationship between each of a plurality of parameters of the first color space and ink deposition.

Example 17 includes the subject matter of Example 16, wherein the first plurality of ink deposition curves represent a relationship between the ink deposition and digital count data for the printer color space.

Example 18 includes the subject matter of Examples 16 and 17, having instructions stored thereon, which when executed by one or more processors, further cause the processors to receive a second plurality of ink deposition curves each associated with one of a plurality of primary color inks of the print system, wherein the associated primary color inks in combination represent a second secondary color different than the first secondary color and generate a color space ink model for each of the first secondary color and the second secondary color based on corresponding ink deposition curves and the color space mapping profile.

Example 19 includes the subject matter of Examples 16-18, having instructions stored thereon, which when executed by one or more processors, further cause the processors to receive the digital count data for the printer color space, receive one or more calibration transfer functions associated with the print system, generate calibrated digital count data by applying the one or more calibration transfer functions to the digital count data and generate the first plurality of ink deposition curves based on the calibrated digital count data.

Example 20 includes the subject matter of Examples 16-19, having instructions stored thereon, which when executed by one or more processors, further cause the processors to receive drop size data, receive drop fractions data and generate the first plurality of ink deposition curves based on the drop size data, the drop fractions data, and the calibrated digital count data.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
    at least one physical memory device to store ink model logic; and
    one or more processors coupled with the at least one physical memory device to execute the ink model logic to:
        receive a first plurality of ink deposition curves each associated with one of a plurality of primary color inks of a print system, wherein the associated primary color inks in combination represent a first secondary color;
        receive a color space mapping profile for the print system, wherein the color space mapping profile characterizes a relationship between a first color space and a printer color space of the print system; and
        generate a color space ink model for the first secondary color based on the first plurality of ink deposition curves and the color space mapping profile, wherein the color space ink model represents a relationship between each of a plurality of parameters of the first color space and ink deposition.

2. The system of claim 1, wherein the first plurality of ink deposition curves represent a relationship between the ink deposition and digital count data for the printer color space.

3. The system of claim 2, wherein the ink model logic further to receive a second plurality of ink deposition curves each associated with one of the plurality of primary color inks of the print system, wherein the associated primary color inks in combination represent a second secondary color different than the first secondary color and generate a color space ink model for each of the first secondary color and the second secondary color based on corresponding ink deposition curves and the color space mapping profile.

4. The system of claim 2, further comprising at least one physical memory device to store ink deposition logic and one or more processors coupled with the at least one physical memory device to execute the ink deposition logic to receive the digital count data for the printer color space, receive one or more calibration transfer functions associated with the print system, generate calibrated digital count data by applying the one or more calibration transfer functions to the digital count data, and generate the first plurality of ink deposition curves based on the calibrated digital count data.

5. The system of claim 4, wherein the ink deposition logic further to receive drop size data, receive drop fractions data and generate the first plurality of ink deposition curves based on the drop size data, the drop fractions data, and the calibrated digital count data.

6. The system of claim 1, wherein the ink deposition comprises an amount of ink deposited on a print medium per unit area.

7. The system of claim 1, further comprising at least one physical memory device to store color management logic and one or more processors coupled with the at least one physical memory device to execute the color management logic to receive digital count data for the printer color space, and convert the digital count data to first color space data in the first color space based on the color space mapping profile, wherein the ink deposition logic further to generate the color space ink model based on the first color space data.

8. The system of claim 1, wherein the color space ink model comprises at least one parametric equation for each of the plurality of parameters of the first color space.

9. The system of claim 1, further comprising at least one physical memory device to store difference estimation logic and one or more processors coupled with the at least one physical memory device to execute the difference estimation logic to determine an ink deposition difference corresponding to a specific Delta E for a pair of input values of the color space for the print system based on the color space ink model.

10. The system of claim 1, further comprising a print controller.

11. A method comprising:
    receiving a first plurality of ink deposition curves each associated with one of a plurality of primary color inks of a print system, wherein the associated primary color inks in combination represent a first secondary color;
    receiving a color space mapping profile for the print system, wherein the color space mapping profile characterizes a relationship between a first color space and a printer color space of the print system; and
    generating a color space ink model for the first secondary color based on the first plurality of ink deposition curves and the color space mapping profile, wherein the color space ink model represents a relationship between each of a plurality of parameters of the first color space and ink deposition.

12. The method of claim 11, wherein the first plurality of ink deposition curves represent a relationship between the ink deposition and digital count data for the printer color space.

13. The method of claim 12, further comprising:
    receiving a second plurality of ink deposition curves each associated with one of the plurality of primary color inks of the print system, wherein the associated primary color inks in combination represent a second secondary color different than the first secondary color; and
    generating a color space ink model for each of the first secondary color and the second secondary color based on corresponding ink deposition curves and the color space mapping profile.

14. The method of claim 12, further comprising:
    receiving the digital count data for the printer color space, receive one or more calibration transfer functions associated with the print system;
    generating calibrated digital count data by applying the one or more calibration transfer functions to the digital count data; and
    generating the first plurality of ink deposition curves based on the calibrated digital count data.

15. The method of claim 14, further comprising:
    receiving drop size data;
    receiving drop fractions data; and
    generating the first plurality of ink deposition curves based on the drop size data, the drop fractions data, and the calibrated digital count data.

16. At least one non-transitory computer readable medium having instructions stored thereon, which when executed by one or more processors, cause the processors to: receive a first plurality of ink deposition curves each associated with one of a plurality of primary color inks of a print system, wherein the associated primary color inks in combination represent a first secondary color;

receive a color space mapping profile for the print system, wherein the color space mapping profile characterizes a relationship between a first color space and a printer color space of the print system; and generate a color space ink model for the first secondary color based on the first plurality of ink deposition curves and the color space mapping profile, wherein the color space ink model represents a relationship between each of a plurality of parameters of the first color space and ink deposition.

17. The computer readable medium of claim 16, wherein the first plurality of ink deposition curves represent a relationship between the ink deposition and digital count data for the printer color space.

18. The computer readable medium of claim 17, having instructions stored thereon, which when executed by one or more processors, further cause the processors to:

receive a second plurality of ink deposition curves each associated with one of a plurality of primary color inks of the print system, wherein the associated primary color inks in combination represent a second secondary color different than the first secondary color; and generate a color space ink model for each of the first secondary color and the second secondary color based on corresponding ink deposition curves and the color space mapping profile.

19. The computer readable medium of claim 17, having instructions stored thereon, which when executed by one or more processors, further cause the processors to:

receive the digital count data for the printer color space;

receive one or more calibration transfer functions associated with the print system;

generate calibrated digital count data by applying the one or more calibration transfer functions to the digital count data; and generate the first plurality of ink deposition curves based on the calibrated digital count data.

20. The computer readable medium of claim 19, having instructions stored thereon, which when executed by one or more processors, further cause the processors to:

receive drop size data;

receive drop fractions data; and generate the first plurality of ink deposition curves based on the drop size data, the drop fractions data, and the calibrated digital count data.

* * * * *